(12) United States Patent
Makita et al.

(10) Patent No.: US 11,904,971 B2
(45) Date of Patent: Feb. 20, 2024

(54) STRADDLED VEHICLE

(71) Applicant: YAMAHA HATSUDOKI KABUSHIKI KAISHA, Iwata (JP)

(72) Inventors: Naoki Makita, Shizuoka (JP); Hayatoshi Sato, Shizuoka (JP); Masaki Torigoshi, Shizuoka (JP); Makoto Kuroiwa, Shizuoka (JP); Naoto Tajima, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 210 days.

(21) Appl. No.: 17/508,639

(22) Filed: Oct. 22, 2021

(65) Prior Publication Data
US 2022/0041240 A1 Feb. 10, 2022

Related U.S. Application Data

(63) Continuation-in-part of application No. PCT/JP2020/005976, filed on Feb. 17, 2020.

(30) Foreign Application Priority Data

Apr. 24, 2019 (JP) .................................. 2019-082884

(51) Int. Cl.
*B62J 41/00* (2020.01)
*B62K 11/04* (2006.01)
(Continued)

(52) U.S. Cl.
CPC .............. *B62J 41/00* (2020.02); *B60K 11/04* (2013.01); *B62K 11/04* (2013.01); *B62M 7/02* (2013.01);
(Continued)

(58) Field of Classification Search
CPC . B62J 41/00; B62K 11/04; B62M 7/02; F02B 29/045; F02B 61/02; F02B 67/10;
(Continued)

(56) References Cited

U.S. PATENT DOCUMENTS 10,087,828 B2 10/2018 Okita

FOREIGN PATENT DOCUMENTS

JP H07187041 A 7/1995
JP 2013212737 A 10/2013
(Continued)

*Primary Examiner* — Loren C Edwards
(74) *Attorney, Agent, or Firm* — Rabin & Berdo. P.C.

(57) ABSTRACT

A straddled vehicle having an engine unit. The engine unit includes an engine body having a cylinder axis tilting forward, a radiator including a radiator core, a turbocharger including a turbine wheel and a compressor wheel, and an intercooler including an intercooler core. In a side view, at least a part of the intercooler core, a part of the turbine wheel and a part of the radiator core are within an area enclosed by a first connecting line, a second connecting line, an engine-body front-surface and a wheel rear-surface. In an upward-downward or forward-backward direction of the cylinder axis, the intercooler-core upper end is more upward than the turbine-wheel upper end, the intercooler-core front end is more frontward than the turbine-wheel front end, the intercooler-core lower end is more upward than the radiator-core upper end, and the radiator-core rear end is more frontward than both the turbine-wheel rear end and the intercooler-core rear end.

11 Claims, 7 Drawing Sheets

(51) Int. Cl.

| | | |
|---|---|---|
| *B62M 7/02* | (2006.01) | |
| *F02B 29/04* | (2006.01) | |
| *B60K 11/04* | (2006.01) | |
| *F01P 3/02* | (2006.01) | |
| *F01P 11/10* | (2006.01) | |
| *F02B 61/02* | (2006.01) | |
| *F02B 67/10* | (2006.01) | |
| *F02B 75/20* | (2006.01) | |

(52) U.S. Cl.
CPC ............... *F01P 3/02* (2013.01); *F01P 11/10* (2013.01); *F02B 29/045* (2013.01); *F02B 29/0475* (2013.01); *B60Y 2200/12* (2013.01); *F01P 2050/16* (2013.01); *F02B 61/02* (2013.01); *F02B 67/10* (2013.01); *F02B 75/20* (2013.01)

(58) Field of Classification Search
CPC ...... F02B 75/20; F02B 75/22; F02B 29/0475; B60Y 2200/12; B60K 11/04; F01P 2050/16; F01P 3/02; F01P 11/10
See application file for complete search history.

(56) References Cited

FOREIGN PATENT DOCUMENTS

| | | | |
|---|---|---|---|
| JP | 2015169186 A | | 9/2015 |
| JP | 2017160841 A | * | 9/2017 |
| JP | 2017160841 A | | 9/2017 |
| JP | 2017186929 A | | 10/2017 |
| WO | 2016098906 A1 | | 6/2016 |

* cited by examiner

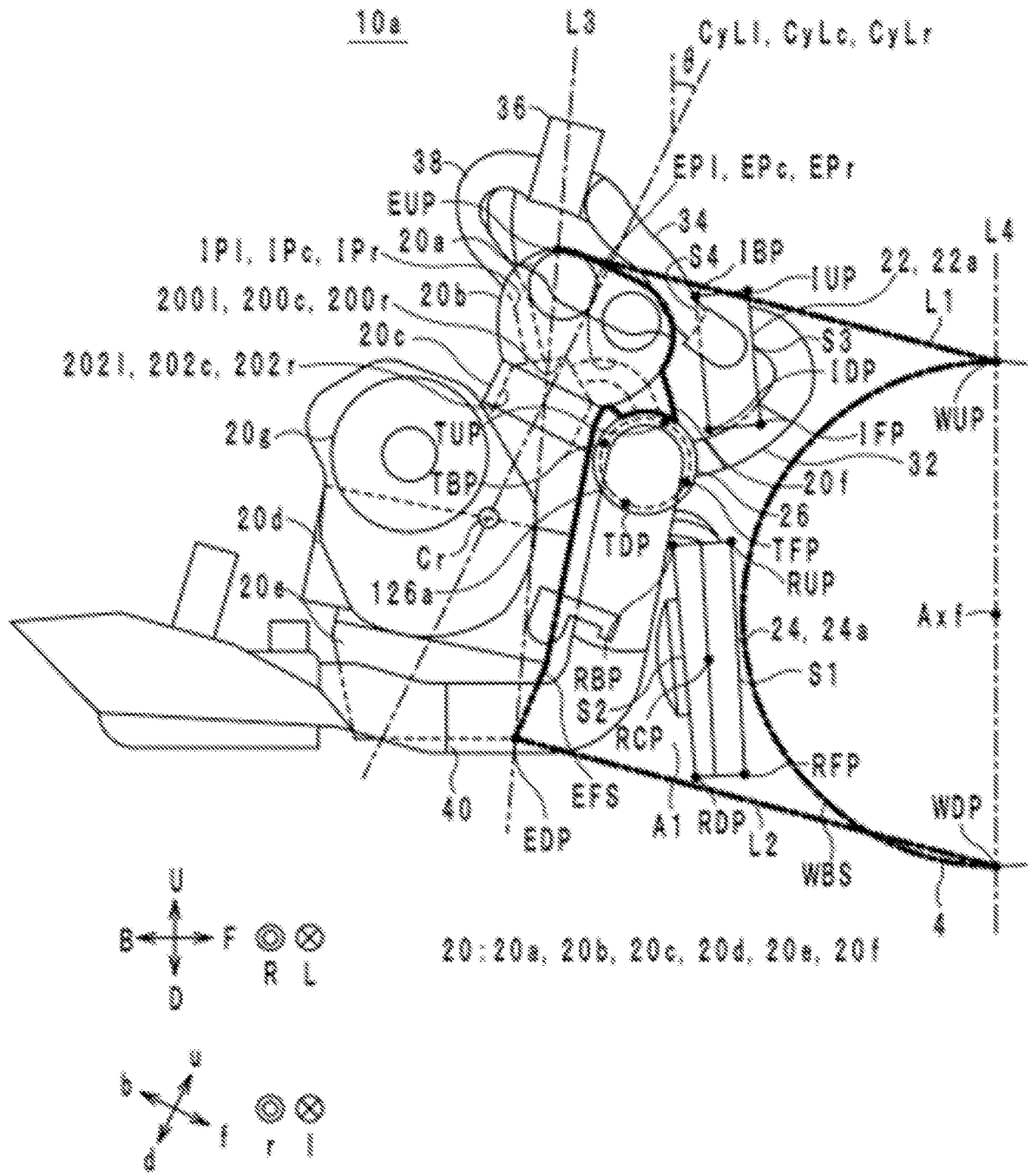

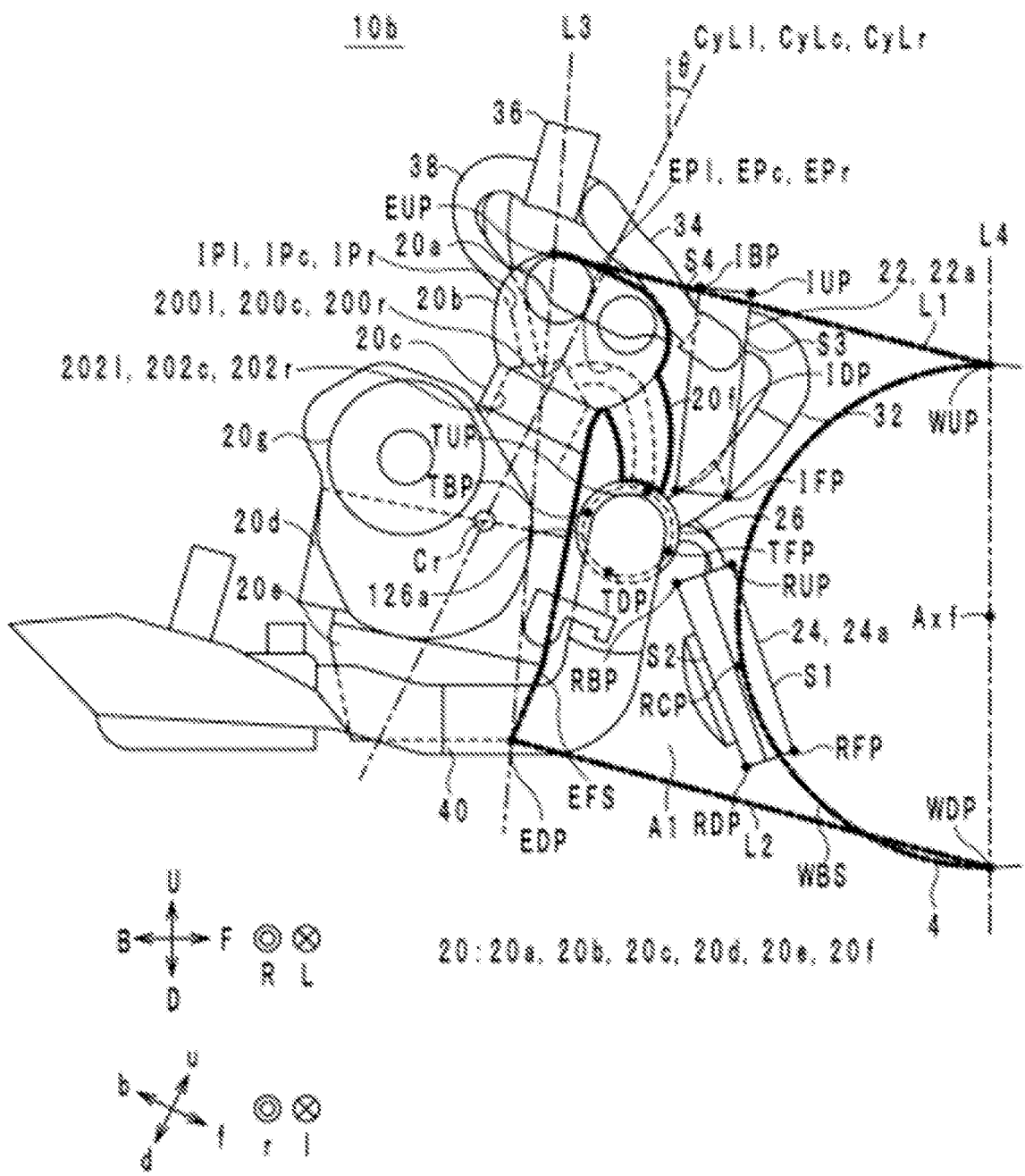

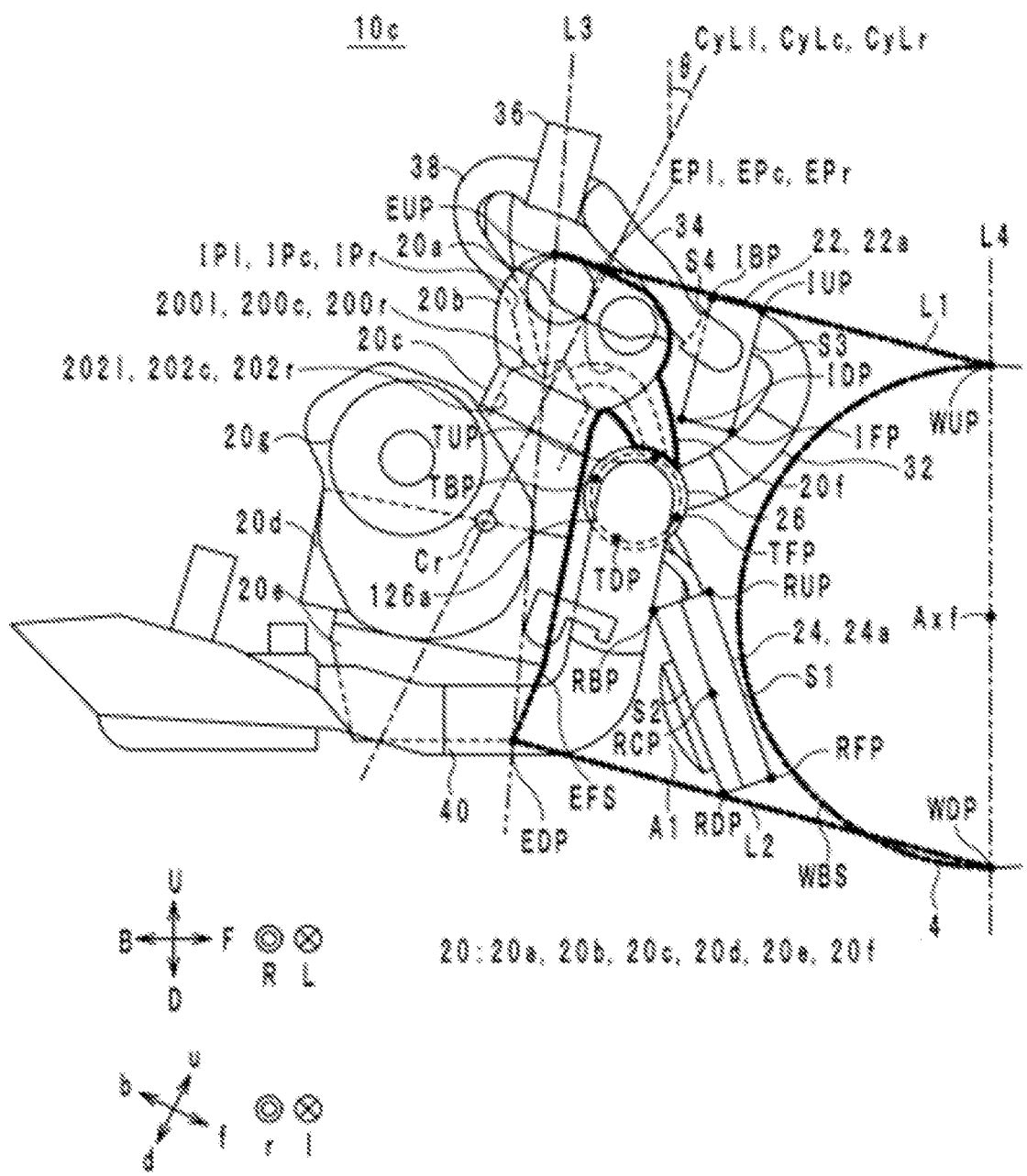

STRADDLED VEHICLE

CROSS-REFERENCE TO RELATED APPLICATIONS

This is a continuation-in-part application of International Application PCT/JP2020/005976 filed on Feb. 17, 2020, which claims priority from a Japanese Application No. 2019-082884, filed on Apr. 24, 2019. The contents of the applications are incorporated herein by reference.

TECHNICAL FIELD

The present teaching relates to a straddled vehicle with a turbocharger and an intercooler.

BACKGROUND ART

As an example of past inventions relating to straddled vehicles, a straddled vehicle disclosed in Patent Literature 1 is known. Patent Literature 1 provides a straddled vehicle that can contain a turbocharger with suppression of size increase to the straddled vehicle.

CITATION LIST

Patent Literature

Patent Literature 1: International Patent Application Publication No. WO 2016/098906

SUMMARY OF INVENTION

Technical Problem

A straddled vehicle with a turbocharger may include an intercooler that cools intake air compressed by the turbocharger. It is desired, in this case, that the intercooler be placed in the straddled vehicle without increasing the wheelbase, which is the distance between the front axle and the rear axle.

An object of the present teaching is to provide a straddled vehicle that can contain a turbocharger and an intercooler with suppression of distance increase to the wheelbase.

Solution to Problem

The present inventors studied about how to arrange some members around the engine in a straddled vehicle containing a turbocharger and an intercooler while suppressing distance increase to the wheelbase. The present inventors noticed that in many cases, a radiator and an intercooler, which are relatively large members, are placed in a space more frontward than the engine. The present inventors thought that some new arrangement of the radiator and the intercooler, which are relatively large members, would be effective to suppress distance increase of the wheelbase.

The present inventors considered the functions of a radiator and an intercooler. A radiator is a device that cools a coolant for cooling an engine. An intercooler is a device that cools intake air compressed by a turbocharger. Therefore, an intercooler and a radiator are connected to an engine via pipes. The pipe connecting the intercooler and the engine and the pipe connecting the radiator and the engine are different in diameter. Specifically, the radiator cools a liquid, while the intercooler cools a gas. Accordingly, the pipe connecting the intercooler and the engine is likely to be greater in diameter than the pipe connecting the radiator and the engine.

The present inventors conceived of positioning the intercooler as close as possible to the engine, thereby reducing the length of the pipe connecting the intercooler and the engine, which has a greater diameter. Accordingly, the total volume of the pipe connecting the intercooler and the engine and the pipe connecting the radiator and the engine would become smaller. The present inventors thought that this would be an effective way to suppress distance increase to the wheelbase of the straddled vehicle.

In order to solve the problem above, the present teaching provides a structure below.

A straddled vehicle of (1) is a straddled vehicle including:
 a vehicle body frame;
 a forward-tilted engine unit supported by the vehicle body frame; and
 at least one front wheel that is positioned more vehicle-frontward than the forward-tilted engine unit when viewed from a vehicle-leftward or vehicle-rightward position,
 wherein:
 the forward-tilted engine unit including:
 a forward-tilted engine body having a cylinder axis that tilts vehicle-forward from a vehicle-upward-downward direction at an angle of 45 degrees or less;
 a radiator, including a radiator core, that cools a coolant for cooling the forward-tilted engine body;
 a turbocharger including: a turbine wheel that is rotatable by exhaust air from the forward-tilted engine body; and a compressor wheel that is connected to the turbine wheel and rotates together with the turbine wheel, the turbocharger compressing intake air by the rotation of the compressor wheel; and
 an intercooler, including an intercooler core, that cools the intake air compressed by the turbocharger; and
 the straddled vehicle satisfies the following conditions (A), (B), (C), (D) and (E):
 (A) the upper end of the forward-tilted engine body in the vehicle-upward-downward direction being defined as forward-tilted-engine-body vehicle-upper end; the lower end of the forward-tilted engine body in the vehicle-upward-downward direction being defined as forward-tilted-engine-body vehicle-lower end; the upper point of the front wheel in the vehicle-upward-downward direction being defined as front-wheel vehicle-upper point; and the lower point of the front wheel in the vehicle-upward-downward direction being defined as front-wheel vehicle-lower point, when viewed from a vehicle-leftward or vehicle-rightward position, at least part of the intercooler core, at least part of the turbine wheel and at least part of the radiator core are all within an area enclosed by: a forward-tilted-engine-body-upper-end-and-front-wheel-upper-point-connect ing line, a forward-tilted-engine-body-lower-end-and-front-wheel-lower-point-connecting line, a forward-tilted-engine-body front-surface, and a front-wheel rear-surface, the forward-tilted-engine-body-upper-end-and-front-wheel-upper-point-connect ing line being a straight line passing through the forward-tilted-engine-body vehicle-upper end and the front-wheel vehicle-upper point, the forward-tilted-engine-body-lower-end-and-front-wheel-lower-point-connecting line being a straight line passing through the forward-tilted-engine-body vehicle-lower end and the front-wheel vehicle-lower point, the forward-tilted-engine-body front-surface being the part of the outside edge of the forward-tilted engine body that is more vehicle-frontward than a forward-tilted-engine-body upper-and-lower-end-connecting line that is a straight line passing through the forward-tilted-engine-body vehicle-upper end and the forward-tilted-engine-body vehicle-lower end, the front-wheel rear-surface being the part of the outside edge of the front wheel that is more vehicle-backward than a front-wheel upper-and-lower-point-connecting line that is a straight line passing through the front-wheel vehicle-upper point and the front-wheel vehicle-lower point;

(B) the direction in which the cylinder axis extends being defined as cylinder-axis-upward-downward direction; the upper end of the intercooler core in the cylinder-axis-upward-downward direction being defined as intercooler-core cylinder-axis-upper end; and the upper end of the turbine wheel in the cylinder-axis-upward-downward direction being defined as turbine-wheel cylinder-axis-upper end, the intercooler-core cylinder-axis-upper end is entirely positioned more cylinder-axis-upward than the turbine-wheel cylinder-axis-upper end;

(C) the direction that tilts vehicle-forward from the cylinder-axis-upward-downward direction at an angle of 90 degrees being defined as cylinder-axis-forward-backward direction; the front end of the intercooler core in the cylinder-axis-forward-backward direction being defined as intercooler-core cylinder-axis-front end; and the front end of the turbine wheel in the cylinder-axis-forward-backward direction being defined as turbine-wheel cylinder-axis-front end, the intercooler-core cylinder-axis-front end is entirely positioned more cylinder-axis-frontward than the turbine-wheel cylinder-axis-front end;

(D) the lower end of the intercooler core in the cylinder-axis-upward-downward direction being defined as intercooler-core cylinder-axis-lower end; and the upper end of the radiator core in the cylinder-axis-upward-downward direction being defined as radiator-core cylinder-axis-upper end, the intercooler-core cylinder-axis-lower end is entirely positioned more cylinder-axis-upward than the radiator-core cylinder-axis-upper end; and (E) the rear end of the radiator core in the cylinder-axis-forward-backward direction being defined as radiator-core cylinder-axis-rear end (REP); the rear end of the turbine wheel in the cylinder-axis-forward-backward direction being defined as turbine-wheel cylinder-axis-rear end; the rear end of the intercooler core in the cylinder-axis-forward-backward direction being defined as intercooler-core cylinder-axis-rear end, the radiator-core cylinder-axis-rear end is entirely positioned more cylinder-axis-frontward than both the turbine-wheel cylinder-axis-rear end and the intercooler-core cylinder-axis-rear end.

The straddled vehicle of (1) can be prevented from increasing in the wheelbase even though containing the turbocharger and the intercooler. Specifically, in the straddled vehicle of (1), when viewed from a vehicle-leftward or vehicle-rightward position, at least part of the intercooler core, at least part of the turbine wheel and at least part of the radiator core are within the area enclosed by the forward-tilted-engine-body-upper-end-and-front-wheel-upper-end-connecting line, the forward-tilted-engine-body-lower-end-and-front-wheel-lower-point-connecting line, and the forward-tilted-engine-body front-surface, and a front-wheel rear-surface. Such a straddled vehicle is likely to have a great wheelbase, that is, has a great distance between the front axle of the front wheel and the rear axle of the rear wheel.

Therefore, the radiator-core cylinder-axis-rear end is entirely positioned more cylinder-axis-frontward than the turbine-wheel cylinder-axis-rear end and the intercooler-core cylinder-axis-rear end. Accordingly, the distance in the cylinder-axis-forward-backward direction between the intercooler core and the forward-tilted engine body is shorter than the distance in the cylinder-axis-forward-backward direction between the radiator core and the forward-tilted engine body. Thereby, the straddled vehicle can be prevented from increasing in the wheelbase for the reasons below.

The radiator core cools a coolant for cooling the forward-tilted engine body. The intercooler core cools the intake air compressed by the turbocharger. Therefore, the intercooler core and the radiator core are connected to the forward-tilted engine body via pipes. The pipe connecting the intercooler core and the forward-tilted engine body and the pipe connecting the radiator core and the forward-titled engine body are different in diameter. Specifically, the radiator core cools a liquid, while the intercooler core cools a gas. Accordingly, the pipe connecting the intercooler core and the forward-tilted engine body is likely to be greater in diameter than the pipe connecting the radiator core and the forward-tilted engine body.

Therefore, in the straddled vehicle of (1), the radiator-core cylinder-axis-rear end is entirely positioned more cylinder-axis-frontward than the turbine-wheel cylinder-axis-rear end and the intercooler-core cylinder-axis-rear end. Accordingly, the distance in the cylinder-axis-forward-backward direction between the intercooler core and the forward-tilted engine body is shorter than the distance in the cylinder-axis-forward-backward direction between the radiator core and the forward-tilted engine body. In other words, the length of the large-diameter pipe, which connects the intercooler core and the forward-tilted engine body, can be reduced. As a result, the total volume of the pipe connecting the intercooler core and the forward-tilted engine body and the pipe connecting the radiator core and the forward-tilted engine body becomes smaller. Thus, the wheelbase of the straddled vehicle of (1) is prevented from increasing.

Another reason why the straddled vehicle (1) can be prevented from increasing in the wheelbase even though containing the turbocharger and the intercooler will be described. Specifically, regarding a forward-tilted engine body, typically, intake air flows into the forward-tiled engine body through the rear surface thereof, and exhaust air flows out of the forward-tilted engine body through the front surface thereof. Accordingly, the pipe connecting the intercooler core and the forward-tilted engine body should be drawn from a more cylinder-axis-frontward area than the forward-tilted engine body to a more cylinder-axis-backward area than the forward-tiled engine body while avoiding passing through the forward-tiled engine body. In addition, a pipe connecting the turbocharger and the forward-tilted engine body (an exhaust manifold) should be drawn to a cylinder-axis-frontward area of the forward-tilted engine body. In the straddled vehicle of (1), the intercooler-core cylinder-axis-upper-end is entirely positioned more cylinder-axis-upward than the turbine-wheel cylinder-axis-upper end. This arrangement eliminates the need to draw the pipe connecting the intercooler core and the forward-tilted engine body in such a manner to avoid the turbocharger. In addition, this arrangement permits the pipe connecting the turbocharger and the forward-tilted engine body to achieve a straightforward connection between the turbocharger and the forward-tilted engine body. Therefore, the pipe connecting the intercooler core and the forward-tilted engine body and the pipe connecting the turbocharger and the forward-tilted engine body become shorter. As a result, the straddled vehicle of (1) can be prevented from increasing in the wheelbase even though containing the turbocharger and the intercooler.

Another reason why the straddled vehicle (1) can be prevented from increasing in the wheelbase even though containing the turbocharger and the intercooler will be described. Specifically, the forward-tilted engine body has a cylinder axis that tilts vehicle-forward from the vehicle-upward-downward direction at an angle of 45 degrees or less. Accordingly, the forward-tilted-engine-body front-surface tilts vehicle-forward from the vehicle-upward-downward direction. In the straddled vehicle of (1), additionally, the intercooler-core cylinder-axis-upper end is entirely positioned more cylinder-axis-upward than the turbine-wheel cylinder-axis-upper end. The intercooler-core cylinder-axis-front end is entirely more cylinder-axis-frontward than the turbine-wheel cylinder-axis-front end. Accordingly, the intercooler core and the turbine wheel are arranged in the cylinder-axis-upward-downward direction along the forward-tilted-engine-body front-surface. Therefore, it is possible to place the intercooler core and the turbine wheel close to the forward-tilted-engine-body front-surface. As a result, the straddled vehicle of (1) can be prevented from increasing in the wheelbase even though containing the turbocharger and the intercooler.

Another reason why the straddled vehicle (1) can be prevented from increasing in the wheelbase even though containing the turbocharger and the intercooler will be described. Specifically, the intercooler-core cylinder-axis-lower end is entirely positioned more cylinder-axis-upward than the radiator-core cylinder-axis-upper end. Accordingly, when viewed from a cylinder-axis-forward or cylinder-axis-backward position, the intercooler core and the radiator core do not overlap with each other. In other words, the intercooler core and the radiator core are not arranged in the cylinder-axis-forward-backward direction. This arrangement prevents an increase in the dimension in the cylinder-axis-forward-backward direction of the space occupied by the intercooler core and the radiator core. As a result, the straddled vehicle of (1) can be prevented from increasing in the wheelbase even though containing the turbocharger and the intercooler.

A straddled vehicle of (2) is the straddled vehicle of (1) wherein, at least part of the intercooler core is above the front axle of the front wheel.

The straddled vehicle of (2) can be prevented from increasing in the wheelbase while containing the turbocharger and the intercooler. In the area above (with respect to the vehicle-upward-downward direction) the front axle, the outside edge of the front wheel is curved vehicle-forward. Accordingly, in the area, due to the curvature of the front wheel, the distance between the outside edge of the front wheel and the forward-tilted engine body gradually increases with going vehicle-upward. Therefore, in the area above (with respect to the vehicle-upward-downward direction) the front axle, a greater space for some members is more easily available in a more vehicle-upward part. For this reason, at least part of the intercooler core is positioned above (with respect to the vehicle-upward-downward direction) the front axle of the front wheel. Thereby, the space for the intercooler core is easily acquired, and the space for the turbocharger and the radiator core becomes easily available. As a result, the straddled vehicle of (2) can be prevented from increasing in the wheelbase even though containing the turbocharger and the intercooler.

A straddled vehicle of (3) is the straddled vehicle (2) wherein: the intercooler core has a board shape having a third main surface having a normal vector extending vehicle-forward, and a fourth main surface having a normal vector extending vehicle-backward; and the third main surface tilts vehicle-forward from the vehicle-upward-downward direction.

The straddled vehicle of (3) can be prevented from increasing in the wheelbase even though containing the turbocharger and the intercooler. Specifically, in the area above (with respect to the vehicle-upward-downward direction) the front axle, the outside edge of the front wheel is curved vehicle-forward. Therefore, the intercooler core is positioned in such a manner that the third main surface thereof tilts vehicle-forward from the vehicle-upward-downward direction. In this way, the intercooler core is positioned along the outside edge of the front wheel. This makes it possible to place the intercooler core close to the front wheel. As a result, the straddled vehicle of (3) can be prevented from increasing in the wheelbase even though containing the turbocharger and the intercooler.

A straddled vehicle of (4) is the straddled vehicle of any one of (1) to (3), wherein at least part of the turbine wheel is above the front axle of the front wheel.

The straddled vehicle of (4) can be prevented from increasing in the wheelbase even though containing the turbocharger and the intercooler. Specifically, in the area above (with respect to the vehicle-upward-downward direction) the front axle, the outside edge of the front wheel is curved vehicle-forward from the vehicle-upward-downward direction. Accordingly, in the area, due to the curvature of the front wheel, the distance between the outside edge of the front wheel and the forward-tilted engine body gradually increases with going vehicle-upward. Therefore, in the area above (with respect to the vehicle-upward-downward direction) the front axle, a greater space for some members is more easily available in a more vehicle-upward part. For this reason, at least part of the turbine wheel is positioned above (with respect to the vehicle-upward-downward direction) the front axle of the front wheel. Thereby, the space for the turbine wheel is easily acquired, and the space for the intercooler core and the radiator core become easily available. As a result, the straddled vehicle of (4) can be prevented from increasing in the wheelbase even though containing the turbocharger and the intercooler.

A straddled vehicle of (5) is the straddled vehicle of any one of (1) to (4), wherein the intercooler core is positioned more vehicle-upward than the turbine wheel.

The straddled vehicle of (5) can be prevented from increasing in the wheelbase even though containing the turbocharger and the intercooler. In the straddled vehicle of (5), the intercooler core is positioned more vehicle-upward than the turbine wheel. Therefore, when seen in the vehicle-downward direction, the intercooler core overlaps the turbine wheel. More specifically, some part of the intercooler core is in the same position with respect to the vehicle-forward-backward-direction as some part of the turbine wheel. This arrangement prevents an increase in the dimension in the vehicle-forward-backward direction of the space occupied by the intercooler core and the turbine wheel. As a result, the straddled vehicle of (5) can be prevented from increasing in the wheelbase even though containing the turbocharger and the intercooler.

A straddled vehicle of (6) is the straddled vehicle of any one of (1) to (5), wherein: the center of the radiator core with respect to the vehicle-upward-downward direction of the radiator core is defined as radiator-core vehicle-upwarddownward-center; and the radiator-core vehicle-upward-downward-center is entirely positioned more vehicle-downward than the front axle of the front wheel.

The straddled vehicle of (6) can be prevented from increasing in the wheelbase even though containing the turbocharger and the intercooler. Specifically, in the area below (with respect to the vehicle-upward-downward direction) the front axle, the outside edge of the front wheel is curved vehicle-backward from the vehicle-upward-downward direction. Accordingly, in the area, due to the curvature of the front wheel, the distance between the outside edge of the front wheel and the forward-tilted engine body gradually increases with going vehicle-downward. Therefore, in the area below (with respect to the vehicle-upward-downward direction) the front axle, a greater space for some members is more easily available in a more vehicle downward part. For this reason, the radiator-core vehicle-upward-downward-center is positioned below (with respect to the vehicle-upward-downward direction) the front axle of the front wheel. Thereby, the space for the radiator core is easily acquired, and the space for the intercooler core and the turbine wheel becomes easily available. As a result, the straddled vehicle of (6) can be prevented from increasing in the wheelbase even though containing the turbocharger and the intercooler.

A straddled vehicle of (7) is the straddled vehicle of (6), wherein: the radiator core has a board shape having a first main surface having a normal vector extending vehicle-forward, and a second main surface having a normal vector extending vehicle-backward; and the first main surface tilts vehicle-backward from the vehicle-upward-downward direction.

The straddled vehicle of (7) can be prevented from increasing in the wheelbase even though containing the turbocharger and the intercooler. Specifically, in the area below (with respect to the vehicle-upward-downward direction) the front axle, the outside edge of the front wheel is curved vehicle-backward from the vehicle-upward-downward direction. Therefore, the radiator core is positioned in such a manner that the first main surface thereof tilts backward from the vehicle-upward-downward direction. In this way, the radiator core is positioned along the outside edge of the front wheel. This makes it possible to place the radiator core close to the front wheel. As a result, the straddled vehicle of (7) can be prevented from increasing in the wheelbase even though containing the turbocharger and the intercooler.

A straddled vehicle of (8) is the straddled vehicle of any one of (1) to (7), wherein: the lower end of the turbine wheel in the cylinder-axis-upward-downward direction of the turbine wheel is defined as turbine-wheel cylinder-axis-lower end; the lower end of the radiator core in the cylinder-axis-upward-downward direction of the radiator core is defined as radiator-core cylinder-axis-lower end; and the turbine-wheel cylinder-axis-lower end is entirely positioned cylinder-axis-upward than the radiator-core cylinder-axis-lower end.

A straddled vehicle of (9) is the straddled vehicle of any one of (1) to (8), wherein the turbine-wheel cylinder-axis-upper end is entirely positioned more cylinder-axis-upward than the radiator-core cylinder-axis-upper end.

A straddled vehicle of (10) is the straddled vehicle of any one of (1) to (9), wherein the radiator-core cylinder-axis-rear end is entirely positioned more cylinder-axis-frontward than the turbine-wheel cylinder-axis-front end.

A straddled vehicle of (11) is the straddled vehicle of any one of (1) to (10), wherein: the lower end of the turbine wheel in the cylinder-axis-upward-downward direction of the turbine wheel is defined as turbine-wheel cylinder-axis-lower end; and the radiator-core cylinder-axis-upper end is entirely positioned more cylinder-axis-upward than turbine-wheel cylinder-axis-lower end.

Some embodiments of the present teaching will hereinafter be described in detail with reference to the drawings, and the detailed description of the embodiments will provide a clearer picture of the above-mentioned object and other objects, the features, the aspects and the advantages of the present teaching.

The term "and/or" used herein includes one of the associated items in a list and all possible combinations of the associated items.

The terms "including", "comprising", or "having", and variations thereof used herein specify the presence of stated features, steps, operations, elements, components, and/or equivalents thereof, and can include one or more of steps, operations, elements, components, and/or their groups.

Unless otherwise defined, all terms (including technical and scientific terms) used herein have the same meanings as commonly understood by one of ordinary skill in the art to which the present teaching pertains.

It should be understood that terms, such as those defined in commonly used dictionaries, should be interpreted as having meanings that are consistent with their meanings in the context of the present disclosure and relevant art and should not be interpreted in an idealized or overly formal sense unless expressly so defined herein.

It should be understood that the description of the present teaching discloses a number of techniques and steps. Each of these has individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching and is not intended to limit the present teaching to the specific embodiments illustrated by drawings or descriptions below.

Effect of Invention

The present teaching prevents a straddled vehicle with a turbocharger and an intercooler from increasing in the wheelbase.

BRIEF DESCRIPTION OF DRAWINGS

FIG. 5 is a right side view of a forward-tilted engine unit 10a according to a first modification.

FIG. 6 is a right side view of a forward-tilted engine unit 10*b* according to a second modification.

FIG. 7 is a right side view of a forward-tilted engine unit 10*c* according to a third modification.

DESCRIPTION OF EMBODIMENTS

Embodiment

[Structure of Straddled Vehicle]

Figure 1:
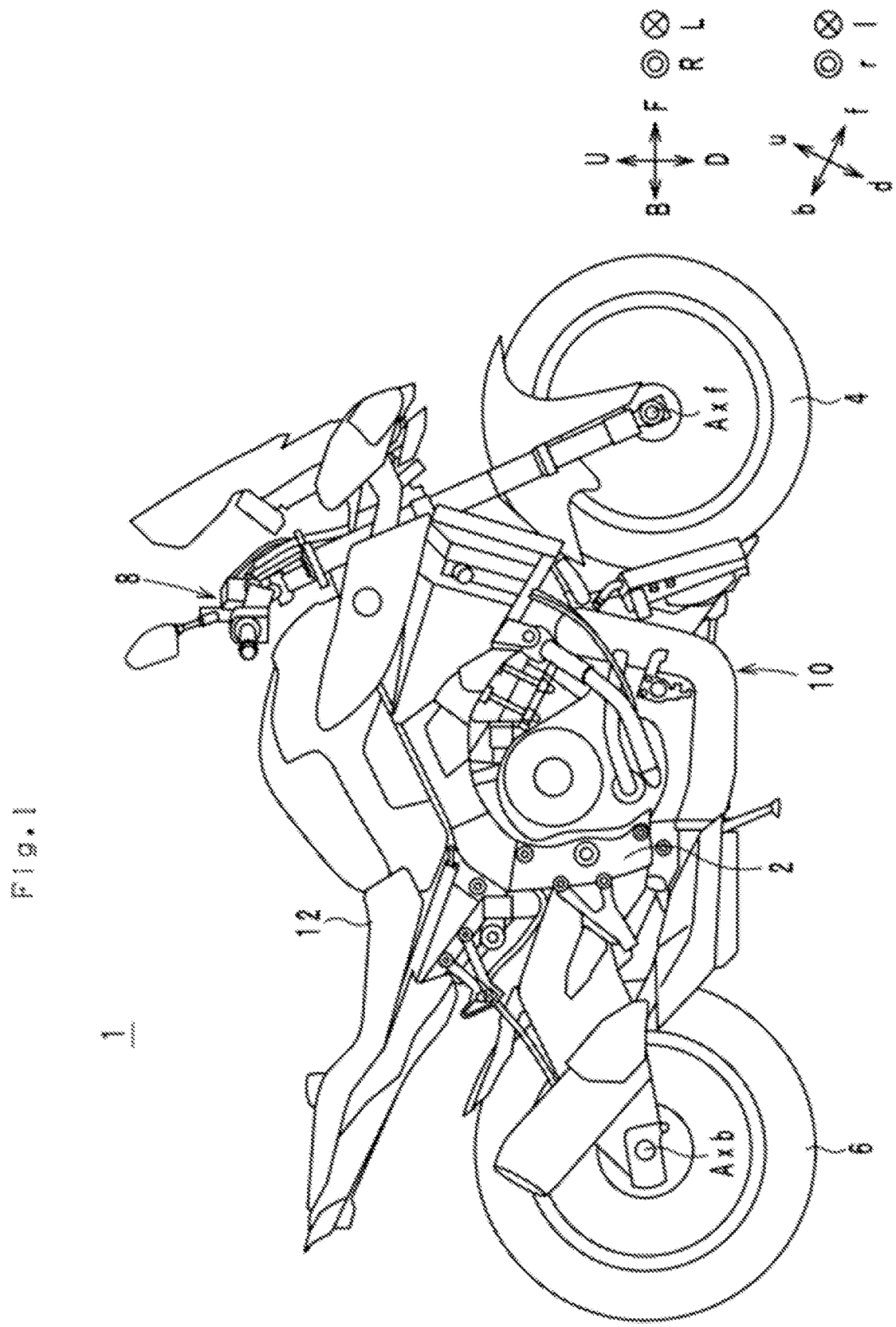
FIG. 1 is a right side view of a straddled vehicle 1.

A straddled vehicle according to an embodiment of the present teaching will hereinafter be described with reference to the drawings. FIG. 1 is a right side view of the straddled vehicle 1.

In the following paragraphs, forward, frontward or the front of the straddled vehicle 1 is referred to simply as forward, frontward or the front F (vehicle-forward or vehicle-frontward). Backward, rearward or the back of the straddled vehicle 1 is referred to simply as backward, rearward or the back B (vehicle-backward or vehicle-rearward). Leftward or the left of the straddled vehicle 1 is referred to simply as leftward or the left L (vehicle-leftward). Rightward or the right of the straddled vehicle 1 is referred to simply as rightward or the right R (vehicle-rightward). Upward, higher or above the straddled vehicle 1 is referred to simply as upward, higher or above U (vehicle-upward). Downward, lower or below the straddled vehicle 1 is referred to simply as downward, lower or below D (vehicle-downward). The forward-backward direction relative to the straddled vehicle 1 is defined as Front-Back Direction FB (vehicle-forward-backward direction). The leftward-and-rightward direction relative to the straddled vehicle 1 is defined as Left-Right Direction LR (vehicle-leftward-and-rightward direction). The upward-downward direction relative to the straddled vehicle 1 is defined as Up-Down Direction UD (vehicle-upward-downward direction). Forward, frontward or the front of the straddled vehicle 1 is forward, frontward or the front from the perspective of a rider riding the straddled vehicle 1. Backward, rearward or the back of the straddled vehicle 1 is backward, rearward or the back from the perspective of a rider riding the straddled vehicle 1. Leftward or the left of straddled vehicle 1 is leftward or the left from the perspective of a rider riding the straddled vehicle 1. Rightward or the right of the straddled vehicle 1 is rightward or the right from the perspective of a rider riding the straddled vehicle 1. Upward, higher or above the straddled vehicle 1 is upward, higher or above from the perspective of a rider riding the straddled vehicle 1. Downward, lower or below the straddled vehicle 1 is downward, lower or below from the perspective of a rider riding the straddled vehicle 1.

In this specification, a shaft or a member that extends in the forward-backward direction does not necessarily mean a shaft or a member that extends parallel and in line with the forward-backward direction. A shaft or a member that extends in the forward-backward direction may include a shaft or a member that tilts from the forward-backward direction in the leftward or rightward direction or the upward or downward direction at an angle within ±45 degrees. In a similar way, a shaft or a member that extends in the upward-downward direction may include a shaft or a member that tilts from the upward-downward direction in the forward or backward direction or the leftward or rightward direction at an angle within ±45 degrees. A shaft or a member that extends in the leftward-and-rightward direction may include a shaft or a member that tilts from the leftward-and-rightward direction in the forward or backward direction or the upward or downward direction at an angle within ±45 degrees. A state in which nobody is riding the straddled vehicle 1, the straddled vehicle 1 is loaded with no fuel, and the front wheel is neither steered nor caused to lean is referred to as an upright state of the vehicle body frame.

When two arbitrary members described in the present specification are defined as a first member and a second member, respectively, the relationship between these two members are as follows. In the present specification, a statement that the first member is supported by the second member includes a case in which the first member is attached to the second member in such a manner that the first member is immovable (that is, fixed in a place) relative to the second member and a case in which the first member is attached to the second member in such a manner that the first member is movable relative to the second member. The statement that the first member is supported by the second member also includes a case in which the first member is directly attached to the second member and a case in which the first member is attached to the second member via a third member.

In the present specification, a statement that refers to the first member and the second member being arranged in the forward-backward direction means that when the first member and the second member are viewed from a position perpendicular to the forward-backward direction (from an upward or downward position or from a leftward or a rightward position), the first member and the second member are on an arbitrary line extending in the forward-backward direction. In the present specification, a statement that the first member and the second member are arranged in the forward-backward direction when viewed from an upward or downward position means the following: when the first member and the second member are viewed from an upward or downward position, the first member and the second member are on an arbitrary line extending in the forward-backward direction. In this case, when the first member and the second member are viewed from a leftward or rightward position, which is different from the upward or downward position, the first member or the second member are not necessarily on the same arbitrary line extending in the forward-backward direction. Further, the first member and the second member may be in contact with or out of contact with each other. A third member may be positioned between the first member and the second member. Such definitions apply to other directions as well as the forward-and backward direction.

In the present specification, a statement that the first member is positioned more frontward than the second member means the following: at least part of the first member is positioned within the area of the range of movement of the second member during a translation of the second member in the forward direction. Accordingly, the first member may be positioned entirely within the area that the second member passes during a translation of the second member in the forward direction, or part of the first member may protrude from the range that the second member passes during a translation in the forward direction. In this case, the first member and the second member are arranged in line in the forward-backward direction. This definition applies to other directions as well as the forward-backward direction.

In the present specification, a statement that the first member is entirely positioned more frontward than the second member means the following: the entire first member is positioned more frontward than the plane that passes the front end of the second member and is perpendicular to the forward-backward direction. In this case, the first member and the second member are not necessarily arranged in line in the forward-backward direction. This definition applies to other directions as well as the forward-backward direction.

In the present specification, a statement that the first member is positioned more forward than the second member when viewed from a leftward or rightward position means the following: when the first member and the second member are viewed from a leftward or rightward position, at least part of the first member is positioned within the area of the range of movement of the second member during a translation of the second member in the forward direction. According to this definition, three-dimensionally, the first member and the second member are not necessarily arranged strictly in line within the forward-backward direction. This definition applies to other directions as well as the forward-backward direction.

In the present specification, unless otherwise noted, parts of the first member are defined as follows. The front part of the first member means the front half of the first member. The rear part of the first member means the rear half of the first member. The left part of the first member means the left half of the first member. The right part of the first member means the right half of the first member. The upper part of the first member means the upper half of the first member. The lower part of the first member means the lower half of the first member. The upper end of the first member means the end of the first member in the upward direction. The lower end of the first member means the end of the first member in the downward direction. The front end of the first member means the end of the first member in the forward direction. The rear end of the first member means the end of the first member in the backward direction. The left end of the first member means the end of the first member in the leftward direction. The right end of the first member means the end of the first member in the rightward direction. The upper end part of the first member means the upper end and the area around the upper end of the first member. The lower end part of the first member means the lower end and the area around the lower end of the first member. The front end part of the first member means the front end and the area around the front end of the first member. The rear end part of the first member means the rear end and the area around the rear end of the first member. The left end part of the first member means the left end and the area around the left end of the first member. The right end part of the first member means the right end and the area around the right end of the first member. The first member is a component of the straddled vehicle 1.

In the present specification, a statement that a structure (member, space or hole) is formed (positioned or provided) between a first member and a second member means that the structure exists between the first member and the second member with respect to the direction in which the first member and the second member are arranged. The structure may or may not protrude in a direction perpendicular to the direction in which the first member and the second member are arranged.

As shown in FIG. 1, the straddled vehicle 1 is, for example, a motorcycle. The straddled vehicle 1 includes a vehicle body frame 2, a front wheel 4, a rear wheel 6, a steering mechanism 8, a forward-tilted engine unit 10, and a seat 12. The vehicle body frame 2 leans leftward L when the straddled vehicle 1 turns to the left L. The vehicle body frame 2 leans rightward R when the straddled vehicle 1 turns to the right R. The vehicle body frame 2 is, for example, a cradle frame, a diamond frame, a truss frame, a twin-spar frame, a monocoque frame, or the like.

The seat 12 is positioned more upward U than the vehicle body frame 2. The seat 12 is supported by the vehicle body frame 2. The rider straddles and sits on the seat 12. Such a vehicle with a seat 12 to be straddled and sat on by a rider is referred to as a straddled vehicle.

The steering mechanism 8 is supported by the front part of the vehicle body frame 2. The steering mechanism 8 steers the front wheel 4 according to the rider's operation. The steering mechanism 8 includes a handlebar, a steering shaft, and a front folk. The handlebar, the steering shaft and the front folk each have a conventional structure, and any detailed descriptions of these parts are not herein provided.

The front wheel 4 is the steerable wheel of the straddled vehicle 1. The front wheel 4 is in the front part of the straddled vehicle 1. The front wheel 4 is supported by the vehicle body frame 2 via the steering mechanism 8. The rider can steer the front wheel 4 by manipulating the handlebar of the steering mechanism 8. The front wheel 4 is rotatable on a front axle Axf.

The rear wheel 6 is the drive wheel of the straddled vehicle 1. The rear wheel 6 is in the rear part of the straddled vehicle 1. The rear wheel 6 is supported by the vehicle body frame 2 via a swing arm. The rear wheel 6 is rotated on a rear axle Axb by the drive force generated by the forward-tilted engine unit 10.

The forward-tilted engine unit 10 is supported by the vehicle body frame 2. The forward-tilted engine unit 10 is positioned more backward B than the front wheel 4 and more frontward F than the rear wheel 6. Thus, the front wheel 4 is positioned more frontward F than the forward-tilted engine unit 10. The rear wheel 6 is positioned more backward B than the forward-tilted engine unit 10. The forward-tilted engine unit 10 generates a drive force that rotates the rear wheel 6. The drive force generated by the forward-tilted engine unit 10 is transmitted to the rear wheel 6, and the rear wheel 6 is rotated by the drive force generated by the forward-tilted engine unit 10.

[Structure of Engine Unit]

Figure 2:
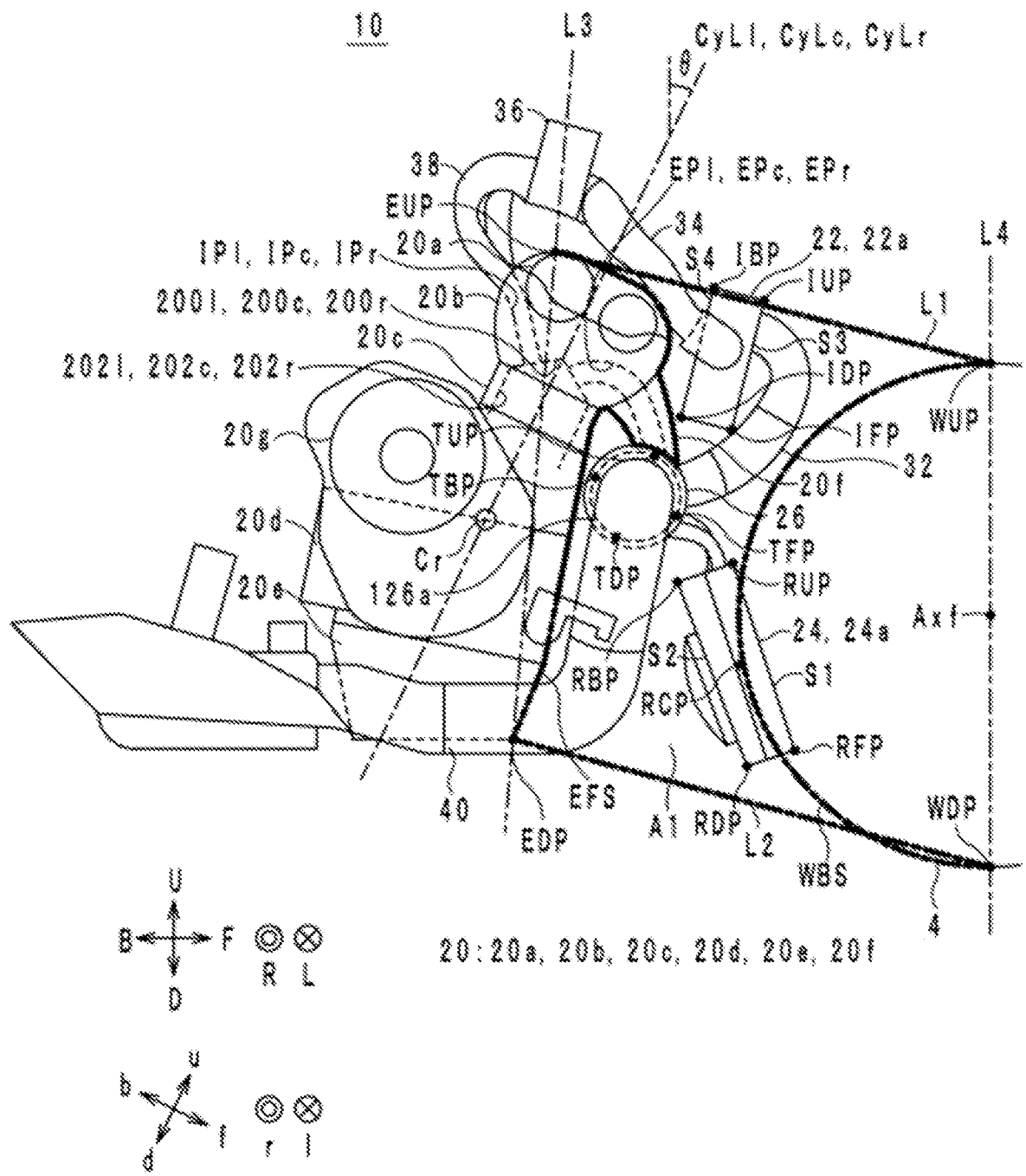
FIG. 2 is a right side view of a forward-tilted engine unit 10 of the straddled vehicle 1.
Figure 3:
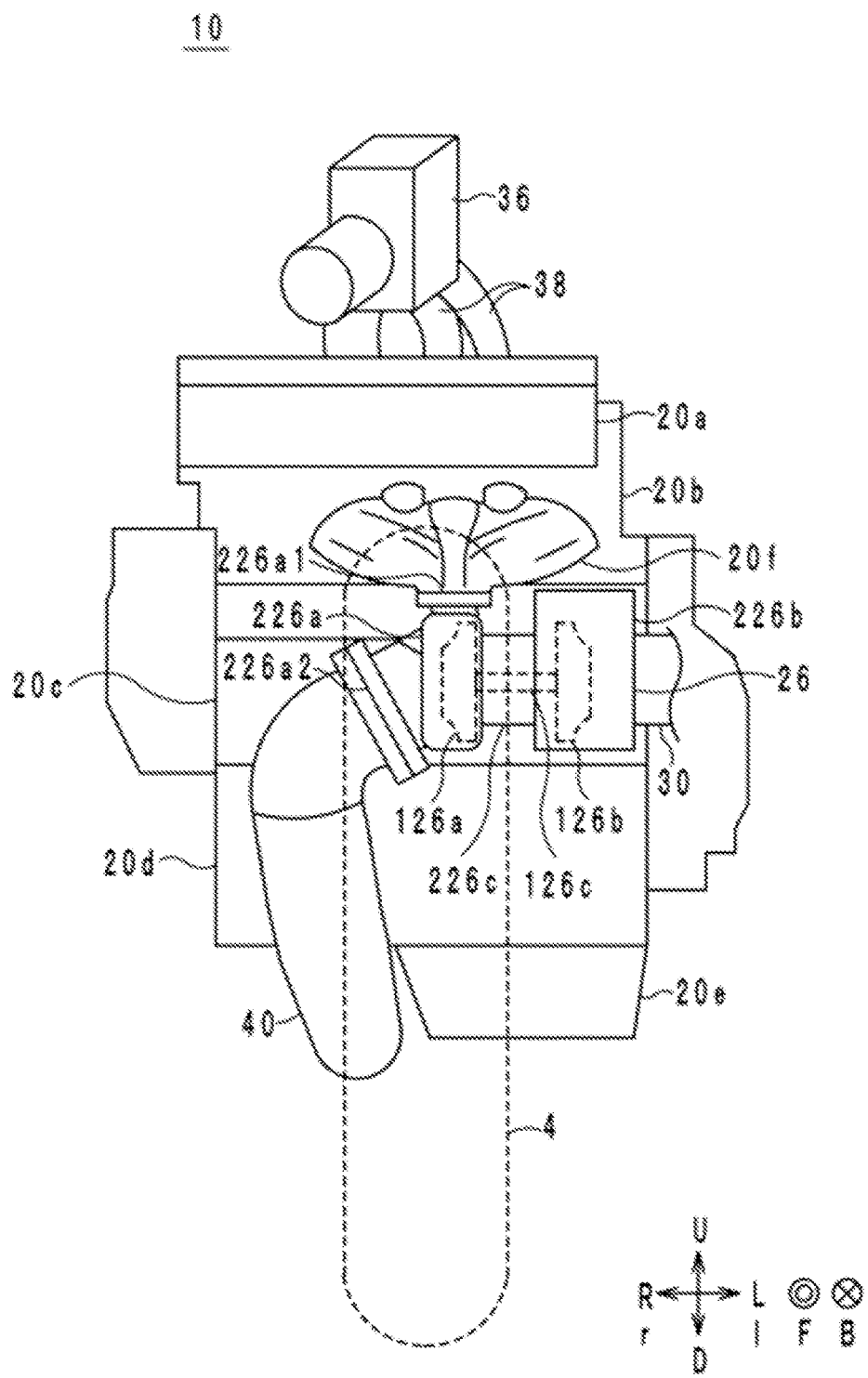
FIG. 3 is a front view of the forward-tilted engine unit 10 of the straddled vehicle 1.
Figure 4:
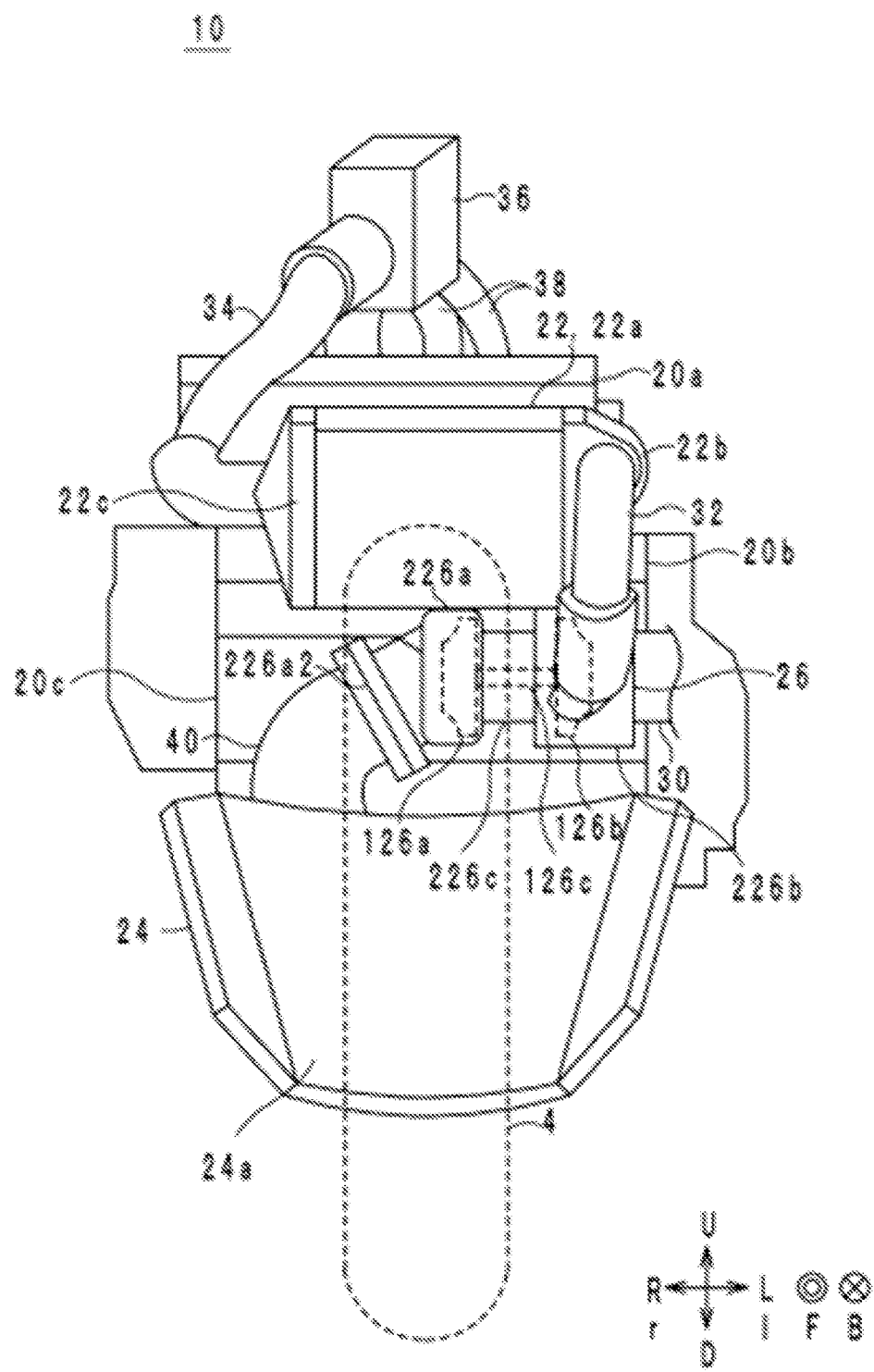
FIG. 4 is another front view of the forward-tilted engine unit 10 of the straddled vehicle 1.

Next, the structure of the forward-tilted engine unit 10 will be described with reference to the drawings. FIG. 2 is a right side view of the forward-tilted engine unit 10 of the straddled vehicle 1. FIGS. 3 and 4 are front views of the forward-tilted engine unit 10 of the straddled vehicle 1. FIG. 4 shows an intercooler 22 and a radiator 24, while FIG. 3 does not show the intercooler 22 and the radiator 24.

The forward-tilted engine unit 10 is a parallel three-cylinder engine as shown in FIG. 2. The forward-tilted engine unit 10 is a four-stroke engine. Accordingly, the forward-tilted engine unit 10 performs an intake step, a compression step, a combustion step, and an exhaust step while the piston is reciprocated twice. However, the forward-tilted engine unit 10 may be a two-stroke engine. The forward-tilted engine unit 10 includes a forward-tilted engine body 20, an intercooler 22, a radiator 24, a turbocharger 26, an upper intake pipe 30 (see FIG. 3), a middle intake pipe 32, a lower intake pipe 34, a throttle body 36, an intake manifold 38, and an exhaust device 40.

The forward-tilted engine body 20 is positioned more backward B than the front wheel 4. Also, when seen in the downward direction (D), the forward-tilted engine body 20 and the front wheel 4 do not overlap each other. The forward-tilted engine body 20 has a left cylinder axis CyLl, a center cylinder axis CyLc and a right cylinder axis CyLr that are tilted forward F from Up-Down Direction UD at an angle of 45 degrees or less. Specifically, the forward-tilted engine body 20 includes a cylinder head cover 20a, a cylinder head 20b, a cylinder block 20c, a crank case 20d, an oil pan 20e, an exhaust manifold 20f, and a transmission 20g. Further, the forward-tilted engine body 20 further includes a left intake valve, a center intake valve, a right intake valve, a left exhaust valve, a center exhaust valve, a right exhaust valve, an intake-side camshaft, an exhaust-side camshaft, a left piston, a center piston, a right piston, a left conrod, a center conrod, a right conrod and a crankshaft, although these parts are not shown in the drawings. However, the forward-tilted engine body 20 does not include an oil filter or engine accessories. Accordingly, the outside edge of the forward-tilted engine body 20 is defined by the outside edges of the cylinder head cover 20a, the cylinder head 20b, the cylinder block 20c, the crank case 20d, the oil pan 20e, and the exhaust manifold 20f.

In the upper part of the cylinder block 20c, a left cylinder bore 202l, a center cylinder bore 202c, and a right cylinder bore 202r, which are shaped like circular cylinders and have central axes extending in Up-Down Direction UD, are formed. The left cylinder bore 202l, the center cylinder bore 202c, and the right cylinder bore 202r are arranged in line in Left-Right Direction LR. The center cylinder bore 202c is positioned more rightward R than the left cylinder bore 202l. The right cylinder bore 202r is positioned more rightward R than the center cylinder bore 202c. The left cylinder bore 202l, the center cylinder bore 202c and the right cylinder bore 202r are positioned corresponding to the left combustion chamber 200l, the center combustion chamber 200c and the right combustion chamber 200r, respectively. The above-mentioned left cylinder axis CyLl, center cylinder axis CyLc and right cylinder axis CyLr are the central axes of the left cylinder bore 202l, the center cylinder bore 202c and the right cylinder bore 202r, respectively. The left cylinder axis CyLl, the center cylinder axis CyLc and the right cylinder axis CyLr are tilted forward F from Up-Down Direction UD at a forward tilt angle θ. The forward tilt angle θ is equal to or less than 45 degrees. The left cylinder axis CyLl, the center cylinder axis CyLc and the right cylinder axis CyLr are not tilted in Left-Right Direction LR from Up-Down Direction UD.

The direction in which the right cylinder axis CyLr extends is defined as Up-Down Direction ud (cylinder-axis-upward-downward direction). The direction that tilts forward F from the right cylinder axis CyLr at an angle of 90 degrees is defined as Front-Back Direction fb (cylinder-axis-forward-backward direction). The direction that is perpendicular to Up-Down Direction ud and Front-Back Direction fb is defined as Left-Right Direction lr (cylinder-axis-leftward-rightward direction). Left-Right Direction lr is the same as Left-Right Direction LR. Upward along Up-Down Direction ud is referred to as upward u (cylinder-axis-upward). Downward along Up-Down Direction ud is referred to as downward d (cylinder-axis-downward). Forward or frontward along Front-Back Direction fb is referred to as forward or frontward f (cylinder-axis-forward or cylinder-axis-frontward). Backward or rearward along Front-Back Direction fb is referred to as backward b (cylinder-axis-backward or cylinder-axis-rearward). Leftward along Left-Right Direction lr is referred to as leftward l (cylinder-axis-leftward). Rightward along Left-Right Direction lr is referred to as rightward r (cylinder axis-rightward).

The left piston (not shown) is positioned within the left cylinder bore 202l. The left piston is connected to a crankshaft via the left conrod (not shown). The left piston is reciprocated in Up-Down Direction ud within the left cylinder bore 202l according to the rotation of the crankshaft (not shown).

The center piston (not shown) is positioned within the center cylinder bore 202c. The center piston is connected to the crankshaft via the center conrod (not shown). The center piston is reciprocated in Up-Down Direction ud within the center cylinder bore 202c according to the rotation of the crankshaft (not shown).

The right piston (not shown) is positioned within the right cylinder bore 202r. The right piston is connected to the crankshaft via the right conrod (not shown). The right piston is reciprocated in Up-Down Direction ud within the right cylinder bore 202r according to the rotation of the crankshaft (not shown).

The lower part of the cylinder block 20c forms an upper part of a crank housing in which the crankshaft is contained. Therefore, the lower part of the cylinder block 20c functions as a crank case upper part.

A crank case 20d is positioned more downward d than the cylinder block 20c. The crank case 20d is fixed to the cylinder block 20c. The crank case 20d forms a lower part of the crank housing in which the crankshaft is contained. Therefore, the crank case 20d functions as a crank case lower part. Thus, the lower part of the cylinder block 20c and the crank case 20d form a crank housing.

The cylinder block 20c and the crank case 20d support the crankshaft (not shown). The crankshaft is rotatable on a crankshaft axis Cr extending in Left-Right Direction lr. when seen in the leftward direction (l), the crankshaft axis Cr is in the bonding plane between the cylinder block 20c and the crank case 20d. Also, the crankshaft axis Cr intersects with the left cylinder axis CyLl, the center cylinder axis CyLc and the right cylinder axis CyLr. The shape of the crankshaft is a common crankshaft shape, and any detailed description of the shape of the crankshaft is not herein provided.

The transmission 20g transmits the rotation of the crankshaft to the rear wheel 6. The transmission 20g changes the rotation speed and torque of the crankshaft. The transmission 20g is positioned more backward B than the crankshaft. The transmission 20g is contained in the crank housing formed of the lower part of the cylinder block 20c and the crank case 20d.

The oil pan 20e is positioned more downward d than the crank case 20d. The oil pan 20e is fixed to the crank case 20d. The oil pan 20e is shaped like a tray. A lubricating oil (engine oil) is stored in the oil pan 20e.

The cylinder head 20b is positioned more upward u than the cylinder block 20c. The cylinder head 20b is fixed to the cylinder block 20c. The cylinder head 20b includes a left combustion chamber 200l, a center combustion chamber 200c, a right combustion chamber 200r, a left intake port IPl, a center intake port Ipc, a right intake port Ipr, a left exhaust port Epl, a center exhaust port Epc, and a right exhaust port Epr.

The left combustion chamber 200l, the center combustion chamber 200c, and the right combustion chamber 200r are spaces formed inside the cylinder head 20b. The left combustion chamber 200l, the center combustion chamber 200c, and the right combustion chamber 200r are connected to the left cylinder bore 202l, the center cylinder bore 202c, and the right cylinder bore 202r, respectively. The left combustion chamber 200l, the center combustion chamber 200c, and the right combustion chamber 200r are arranged in line in Left-Right Direction LR. The center combustion chamber 200c is positioned more rightward R than the left combustion chamber 200l. The right combustion chamber 200r is positioned more rightward R than the center combustion chamber 200c.

The left combustion chamber 2001 is a space enclosed by a left piston (not shown) positioned at the upper dead point, the cylinder head 20b, the left intake valve (not shown) and the left exhaust valve (not shown). The left combustion chamber 2001 is connected to the left cylinder bore 2021. The left combustion chamber 2001 is a space where a gas mixture of air and fuel (for example, gasoline) burns. The left intake port Ipl is a hole connecting the outside of the forward-tilted engine body 20 and the left combustion chamber 2001. The left intake port Ipl leads the gas mixture to the left combustion chamber 2001. The left intake port Ipl has an open end on the rear part of the surface of the cylinder head 20b. The left exhaust port Epl is a hole connecting the outside of the forward-tilted engine body 20 and the left combustion chamber 2001. The left exhaust port Epl leads the exhaust air generated by the combustion of the gas mixture to the outside of the forward-tilted engine body 20. The left exhaust port Epl has an open end on the front part of the surface of the cylinder head 20b.

The center combustion chamber 200c is a space enclosed by a center piston (not shown) positioned at the upper dead point, the cylinder head 20b, the center intake valve (not shown) and the center exhaust valve (not shown). The center combustion chamber 200c is connected to the center cylinder bore 202c. The center combustion chamber 200c is a space where a gas mixture of air and fuel (for example, gasoline) burns. The center intake port Ipc is a hole connecting the outside of the forward-tilted engine body 20 and the center combustion chamber 200c. The center intake port Ipc leads the gas mixture to the center combustion chamber 200c. The center intake port Ipc has an open end on the rear part of the surface of the cylinder head 20b. The center exhaust port Epc is a hole connecting the outside of the forward-tilted engine body 20 to the center combustion chamber 200c. The center exhaust port Epc leads the exhaust air generated by the combustion of the gas mixture to the outside of the forward-tilted engine body 20. The center exhaust port Epc has an open end on the front part of the surface of the cylinder head 20b.

The right combustion chamber 200r is a space enclosed by a right piston (not shown) positioned at the upper dead point, the cylinder head 20b, the right intake valve (not shown) and the right exhaust valve (not shown). The right combustion chamber 200r is connected to the right cylinder bore 202r. The right combustion chamber 200r is a space where a gas mixture of air and fuel (for example, gasoline) burns. The right intake port Ipr is a hole connecting the outside of the forward-tilted engine body 20 and the right combustion chamber 200r. The right intake port Ipr leads the gas mixture to the right combustion chamber 200r. The right intake port Ipr has an open end on the rear part of the surface of the cylinder head 20b. The right exhaust port Epr is a hole connecting the outside of the forward-tilted engine body 20 and the right combustion chamber 200r. The right exhaust port Epr leads the exhaust air generated by the combustion of the gas mixture to the outside of the forward-tilted engine body 20. The right exhaust port Epr has an open end on the front part of the surface of the cylinder head 20b.

The left intake valve (not shown) is positioned at the boundary between the left intake port Ipl and the left combustion chamber 2001. When the left intake valve is open, the left intake port Ipl and the left combustion chamber 2001 are connected. Thereby, the gas mixture flows from the left intake port Ipl into the left combustion chamber 2001. When the left intake valve is closed, the flow of the gas mixture from the left intake port Ipl into the left combustion chamber 2001 is blocked. In the same manner, the center intake valve (not shown) is positioned at the boundary between the center intake port Ipc and the center combustion chamber 200c. When the center intake valve is open, the center intake port Ipc and the center combustion chamber 200c are connected. Thereby, the gas mixture flows from the center intake port Ipc into the center combustion chamber 200c. When the center intake valve is closed, the flow of the gas mixture from the center intake port Ipc into the center combustion chamber 200c is blocked. In addition, the right intake valve (not shown) is positioned at the boundary between the right intake port Ipr and the right combustion chamber 200r. When the right intake valve is open, the right intake port Ipr and the right combustion chamber 200r are connected. Thereby, the gas mixture flows from the right intake port Ipr into the right combustion chamber 200r. When the right intake valve is closed, the flow of the gas mixture from the right intake port Ipr into the right combustion chamber 200r is blocked.

The left exhaust valve (not shown) is positioned at the boundary between the left exhaust port Epl and the left combustion chamber 2001. When the left exhaust valve is open, the left exhaust port Epl and the left combustion chamber 2001 are connected. Thereby, the exhaust air flows from the left combustion chamber 2001 into the left exhaust port Epl. When the left exhaust valve is closed, the flow of exhaust air from the left combustion chamber 2001 into the left exhaust port Epl is blocked. In the same manner, the center exhaust valve (not shown) is positioned at the boundary between the center exhaust port Epc and the center combustion chamber 200c. When the center exhaust valve is open, the center exhaust port Epc and the center combustion chamber 200c are connected. Thereby, the exhaust air flows from the center combustion chamber 200c into the center exhaust port Epc. When the center exhaust valve is closed, the flow of exhaust air from the center combustion chamber 200c into the center exhaust port Epc is blocked. In addition, the right exhaust valve (not shown) is positioned at the boundary between the right exhaust port Epr and the right combustion chamber 200r. When the right exhaust valve is open, the right exhaust port Epr and the right combustion chamber 200r are connected. Thereby, the exhaust air flows from the right combustion chamber 200r into the right exhaust port Epr. When the right exhaust valve is closed, the flow of exhaust air from the right combustion chamber 200r into the right exhaust port Epr is blocked.

The cylinder head 20b supports an intake-side camshaft (not shown) and an exhaust-side camshaft (not shown). The intake-side camshaft and the exhaust-side camshaft are arranged in Front-Back Direction fb. The intake-side camshaft is positioned more backward b than the exhaust-side camshaft. The intake-side camshaft is rotatable on an axis extending in Left-Right Direction lr. Accordingly, the intake-side camshaft is able to open and close the left intake valve, the center intake valve and the right intake valve. The exhaust-side camshaft is rotatable on another axis extending in Left-Right Direction lr. Accordingly, the exhaust-side camshaft is able to open and close the left exhaust valve, the center exhaust valve and the right exhaust valve.

The exhaust manifold 20f is positioned more frontward f than the cylinder head 20b. The exhaust manifold 20f is fixed to the cylinder head 20b. In the present embodiment, the exhaust manifold 20f is formed integrally with the cylinder head 20b. Therefore, it is impossible to separate the exhaust manifold 20f from the cylinder head 20b without breaking the cylinder head 20b and the exhaust manifold 20f.

The exhaust manifold 20f is a part of an exhaust passage in which exhaust air flowing from the left exhaust port Epl, the center exhaust port Epc and the right exhaust port Epr flows. The exhaust manifold 20f joins the three exhaust ports, namely, the left exhaust port Epl, the center exhaust port Epc and the right exhaust port Epr, into one exhaust passage. As shown in FIG. 2, the exhaust manifold 20f extends from the cylinder head 20b in a diagonal manner forward f and downward d (which will hereinafter be referred to as front-downward fd). The end in the front-downward direction fd (which will hereinafter be referred to as front-lower (fd) end) of the exhaust manifold 20f is positioned more frontward f than the cylinder block 20c. One exhaust outlet, through which the exhaust air flows out, is formed at the front-lower (fd) end of the exhaust manifold 20f. The exhaust outlet has an open end facing front-downward fd. Accordingly, the exhaust air flows front-downward fd.

The cylinder head cover 20a is positioned more upward u than the cylinder head 20b. The cylinder head cover 20a is fixed to the cylinder head 20b. The cylinder head cover 20a covers the intake-side camshaft (not shown) and the exhaust-side camshaft (not shown).

The forward-tilted engine body 20 having the above structure is made of, for example, iron. However, the forward-tilted engine body 20 may be made of aluminum, an aluminum alloy, or iron and aluminum. When the forward-tilted engine body 20 is made of iron and aluminum, some part of the forward-tilted engine body 20 is made of iron, and the other part of the forward-tilted engine body 20 is made of aluminum. The forward-tilted engine body 20 is made by casting, for example. In the present embodiment, especially, the cylinder head 20b and the exhaust manifold 20f are made as one whole piece during the casting process.

The upper intake pipe 30 (see FIG. 3), the middle intake pipe 32, the lower intake pipe 34, the throttle body 36, and the intake manifold 38 are conduits in which the intake air flows. The upper end of each member which the intake air flows through first will hereinafter be referred to as an upstream end. The lower end of each member which the intake air flows through last will hereinafter be referred to as a downstream end.

As shown in FIG. 4, the upper intake pipe 30, the turbocharger 26, the middle intake pipe 32, the intercooler 22, the lower intake pipe 34, the throttle body 36, and the intake manifold 38 are arranged in line in this order from upstream to downstream of the flow of the intake air (along with the flow of the intake air). More specifically, the upstream end of the upper intake pipe 30 is connected to an air cleaner box (not shown). The downstream end of the upper intake pipe 30 is connected to the turbocharger 26. The upstream end of the middle intake pipe 32 is connected to the turbocharger 26. The downstream end of the middle intake pipe 32 is connected to the intercooler 22. The upstream end of the lower intake pipe 34 is connected to the intercooler 22. The downstream end of the lower intake pipe 34 is connected to the throttle body 36. The upstream end of the intake manifold 38 is connected to the throttle body 36. The downstream end of the intake manifold 38 is connected to the upstream end of the left intake port Ipl (see FIG. 2), the upstream end of the center intake port Ipc (see FIG. 2), and the upstream end of the right intake port Ipr (see FIG. 2). Intake air is taken into the air cleaner box (not shown) of the straddled vehicle 1. Thereafter, the intake air flows through the air cleaner box, the upper intake pipe 30, the turbocharger 26, the middle intake pipe 32, the intercooler 22, the lower intake pipe 34, the throttle body 36, and the intake manifold 38, and the intake air diverges and flows through the left intake port Ipl, the center intake port Ipc and the right intake port Ipr into the left combustion chamber 200l, the center combustion chamber 200c and the right combustion chamber 200r.

The throttle body 36 adjusts the volume of intake air flowing into the intake manifold 38. The throttle body 36 has a common structure for a throttle body, and any detailed description of the structure of the throttle body 36 is not herein provided.

A left injector (not shown) is supported by the cylinder head 20b. The lower end of the left injector is positioned in the left combustion chamber 200l. The left injector injects fuel into the left combustion chamber 200l. Thereby, the fuel is mixed with the intake air flowing into the left combustion chamber 200l and turns into a gas mixture. Also, a left spark plug (not shown) is supported by the cylinder head 20b. The lower end of the left spark plug is positioned in the left combustion chamber 200l. The left spark plug ignites the gas mixture in the left combustion chamber 200l.

A center injector (not shown) is supported by the cylinder head 20b. The lower end of the center injector is positioned in the center combustion chamber 200c. The center injector injects fuel into the center combustion chamber 200c. Thereby, the fuel is mixed with the intake air flowing into the center combustion chamber 200c and turns into a gas mixture. Also, a center spark plug (not shown) is supported by the cylinder head 20b. The lower end of the center spark plug is positioned in the center combustion chamber 200c. The center spark plug ignites the gas mixture in the center combustion chamber 200c.

A right injector (not shown) is supported by the cylinder head 20b. The lower end of the right injector is positioned in the right combustion chamber 200r. The right injector injects fuel into the right combustion chamber 200r. Thereby, the fuel is mixed with the intake air flowing into the right combustion chamber 200r and turns into a gas mixture. Also, a right spark plug (not shown) is supported by the cylinder head 20b. The lower end of the right spark plug is positioned in the right combustion chamber 200r. The right spark plug ignites the gas mixture in the right combustion chamber 200r.

The exhaust device 40 is a pipe in which the exhaust air flows. The exhaust device 40 includes an exhaust pipe, a muffler and a catalyst. Any detailed descriptions of the exhaust pipe, the muffler and the catalyst are not herein provided. The upper end of each member which the exhaust air flows through first will hereinafter be referred to as an upstream end. The lower end of each member which the exhaust air flows through last will hereinafter be referred to as a downstream end. As shown in FIG. 2, the exhaust manifold 20f, the turbocharger 26 and the exhaust device 40 are arranged in line in this order from upstream to downstream of the flow of the exhaust air (along with the flow of the exhaust air). More specifically, the upstream end of the exhaust manifold 20f is connected to the left exhaust port Epl, the center exhaust port Epc and the right exhaust port Epr. The downstream end of the exhaust manifold 20f is connected to the turbocharger 26. The upstream end of the exhaust device 40 is connected to the turbocharger 26. Thereby, the exhaust air flows from the left combustion chamber 200l, the center combustion chamber 200c and the right combustion chamber 200r into the left exhaust port Epl, the center exhaust port Epc and the right exhaust port Epr, respectively. The exhaust air flows from the left exhaust port Epl, the center exhaust port Epc and the right exhaust port Epr to the exhaust manifold 20f and thereafter flows through the turbocharger 26 and the exhaust device 40. Then, the exhaust air flows out of the straddled vehicle 1.

The forward-tilted engine body 20 is cooled by an engine coolant flowing through the forward-tilted engine body 20. The upper end of each member which the coolant flows through first will hereinafter be referred to as an upstream end. The lower end of each member which the coolant flows through last will hereinafter be referred to as a downstream end.

For the forward-tilted engine body 20, a water jacket (not shown) in which the coolant for cooling the forward-tilted engine body 20 flows, is provided. The downstream end of the water jacket is connected to the upstream end of the radiator 24 via a radiator upper hose (not shown). The upstream end of the water jacket is connected to the downstream end of the radiator 24 via a radiator lower hose (not shown). In addition, a water pump (not shown) is provided for the forward-tiled engine body 20. The water pump is driven by a drive force generated by the forward-tilted engine body 20 and circulates the coolant between the forward-tilted engine body 20 and the radiator 24.

The radiator 24 cools the coolant for cooling the forward-tilted engine body 20. More specifically, the coolant cools the forward-tilted engine body 20 by flowing in the water jacket over the forward-tilted engine body 20. During this process, the coolant is heated by the forward-tilted engine body 20. The coolant heated by the forward-tilted engine body 20 flows into the radiator 24 via the radiator upper hose. The radiator 24 cools the coolant heated by the forward-tilted engine body 20. The coolant cooled by the radiator 24 flows into the water jacket over the forward-tilted engine body 20 via the radiator lower hose.

The radiator 24 includes a radiator core 24a. As shown in FIG. 2, the radiator core 24a is like a plate and has two main surfaces, namely, a first main surface S1, which has a normal vector extends in Forward Direction F, and a second main surface S2, which has a normal vector extends in Backward Direction B. In the present embodiment, the radiator core 24a is like a plate, which is rectangular when seen in the backward direction (B). However, the radiator core 24a is slightly curved in such a manner that the center portion of the radiator core 24a with respect to Left-Right Direction LR bulges backward B from the left end and the right end of the radiator core 24a. This prevents the radiator core 24a from coming into contact with the front wheel 4. In addition, the radiator core 24a tilts backward B from Up-Down Direction UD. Accordingly, the first main surface S1 tilts from backward B from Up-Down Direction UD, and the upper end of the first main surface S1 is entirely positioned more backward B than the lower end of the first main surface S1.

The radiator core 24a includes radiator fins and a plurality of tubes. The radiator upper hose and the radiator lower hose are not included in the radiator core 24a, and the radiator core 24a does not include a radiator cap, a reservoir tank, an upper tank, a lower tank or an electric fan. The tubes are arranged in the radiator core 24a, for example, in such a manner as to extend in Left-Right Direction lr. The radiator fins are arranged in such a manner to be in contact with the tubes. When the straddled vehicle 1 is moving, the wind blows to the radiator core 24a from the front F. The wind cools the coolant flowing in the tubes.

The radiator 24 with the above-described structure is positioned in a place where the radiator 24 is likely to be exposed to the wind blowing from the front F of the straddle vehicle 1 when the straddle vehicle 1 is moving. Accordingly, as shown in FIG. 2, the radiator 24 is positioned more backward B than the front wheel 4 and more frontward F than the crank case 20d and the oil pan 20e of the forward-tilted engine body 20. As shown in FIG. 4, when seen in the backward direction (B), the center of the radiator core 24a with respect to Left-Right Direction lr is behind the front wheel 4. The center of the radiator core 24a with respect to Up-Down Direction UD will hereinafter referred to as a radiator-core vehicle-upward-downward-center RCP (see FIG. 2). As shown in FIG. 2, the radiator-core vehicle-upward-downward-center RCP is positioned below (D) the front axle Axf of the front wheel 4.

[Structure of Turbocharger]

Next, the structure of the turbocharger 26 will be described with reference to FIGS. 2 to 4. The turbocharger 26 includes a turbine wheel 126a and a compressor wheel 126b. The turbine wheel 126a is rotatable by the exhaust air from the forward-tilted engine body 20, and the compressor wheel 126b is connected to the turbine wheel 126a and rotates together with the turbine wheel 126a. The turbocharger 26 compresses the intake air by the rotation of the compressor wheel 126b. The turbocharger 26 will hereinafter be described in more detail.

As shown in FIG. 3, the turbocharger 26 includes a shaft 126c and a turbocharger case 226 in addition to the turbine wheel 126a and the compressor wheel 126b. As shown in FIG. 2, when seen in the leftward direction (l), the turbine wheel 126a is circular. The turbine wheel 126a has a plurality of blades. The compressor wheel 126b is positioned more leftward l than the turbine wheel 126a. When seen in the rightward direction (r), the compressor wheel 126b is circular. The compressor wheel 126b has a plurality of blades. The shaft 126c is a bar-like member extending in Left-Right Direction lr. The shaft 126c connects the turbine wheel 126a and the compressor wheel 126b. Accordingly, the turbine wheel 126a and the compressor wheel 126b are rotatable together on the central axis of the shaft 126c.

The turbocharger case 226 contains the turbine wheel 126a, the compressor wheel 126b and the shaft 126c. The turbocharger case 226 includes a turbine housing 226a, a compressor housing 226b, and a center housing 226c. The center housing 226c is shaped like a cylinder, which has an central axis extending in Left-Right Direction lr. The center housing 226c supports the shaft 126c via a bearing (not shown). The shaft 126c is rotatable on the central axis of the shaft 126c itself relative to the center housing 226c.

The turbine housing 226a is positioned more rightward r than the center housing 226c. The turbine housing 226a is fixed to the center housing 226c. The turbine housing 226a contains the turbine wheel 126a. As shown in FIG. 3, the downstream end of the exhaust manifold 20f is connected to the upper part of the surface of the turbine housing 226a. The upstream end 226a1 of the turbine housing 226a is a joint surface with the downstream end of the exhaust manifold 20f. In the present embodiment, a flange at the upstream end of the turbine housing 226a and a flange at the downstream end of the exhaust manifold 20f are fixed together by fastening means, such as a bolt and a nut, or the like. Accordingly, the upstream end 226a1 of the turbine housing 226a is where a plane exists in which the flange of the turbine housing 226a is in contact with the exhaust manifold 20f. The upstream end of the exhaust device 40 is connected to the right part of the surface of the turbine housing 226a. The downstream end 226a2 of the turbine housing 226a is a joint surface with the upstream end of the exhaust device 40. In the present embodiment, a flange at the downstream end of the turbine housing 226a and a flange at the upstream end of the exhaust device 40 are fixed together by fastening means, such as a bolt and a nut, or the like. Accordingly, the downstream end 226a2 of the turbine housing 226a is where a plane exists in which the flange of the turbine housing 226a is in contact with the exhaust device 40.

The compressor housing 226b is positioned more leftward 1 than the center housing 226c. The compressor housing 226b is fixed to the center housing 226c. The compressor housing 226b contains the compressor wheel 126b. As shown in FIG. 4, the downstream end of the upper intake pipe 30 is connected to the left part of the surface of the compressor housing 226b. The upstream end of the middle intake pipe 32 is connected to the front part of the surface of the compressor housing 226b.

The turbocharger 26 with the above-described structure operates as follows. First, the exhaust air flows from the exhaust manifold 20f into the turbine housing 226a. The exhaust air hits the blades of the turbine wheel 126a. Thereby, the turbine wheel 126a rotates on the central axis of the shaft 126c. The exhaust air flows out of the turbine housing 226a into the exhaust device 40.

In addition, the compressor wheel 126b is connected to the turbine wheel 126a via the shaft 126c. Therefore, the compressor wheel 126b rotates on the central axis of the shaft 126c with the rotation of the turbine wheel 126a. The intake air flows from the upper intake pipe 30 into the compressor housing 226b. The intake air is compressed by the blades of the compressor wheel 126b. The compressed intake air flows out of the compressor housing 226b into the middle intake pipe 32.

As shown in FIG. 2, the turbocharger 26 is positioned more backward B than the front wheel 4 and more frontward F than the cylinder block 20c of the forward-tilted engine body 20. Further, as shown in FIG. 4, when seen in the backward direction (B), the turbocharger 26 is positioned more upward U than the radiator 24. In addition, as shown in FIG. 2, at least part of the turbine wheel 126a is above (U) the front axle Axf of the front wheel 4. In the present embodiment, the turbine wheel 126a is entirely positioned above (U) the front axle Axf of the front wheel 4.

[Structure of Intercooler]

Next, the structure of the intercooler 22 will be described with reference to FIGS. 2 to 4. The intercooler 22 cools the intake air compressed by the turbocharger 26, and the intercooler 22 includes an intercooler core 22a. The intercooler 22 will hereinafter be described in more detail.

As shown in FIG. 4, the intercooler 22 includes an inlet-side header 22b and an outlet-side header 22c in addition to the intercooler core 22a. As shown in FIG. 2, the intercooler core 22a is like a plate with two main surfaces, namely, a third main surface S3 and a fourth main surface S4. The third main surface S3 has a normal vector extending forward F, and the fourth main surface S4 has a normal vector extending backward B. In the present embodiment, when seen in the backward direction (B), the intercooler core 22a is rectangular. The intercooler core 22a tilts forward F from Up-Down Direction UD. Accordingly, the third main surface S3 tilts forward F from the Up-Down Direction UD. The upper end of the third main surface S3 is positioned more frontward F than the lower end of the third main surface S3.

The inlet-side header 22b is positioned more leftward 1 than the intercooler core 22a. The downstream end of the middle intake pipe 32 is connected to the inlet-side header 22b. The outlet-side header 22c is positioned more rightward r than the intercooler core 22a. The upstream end of the lower intake pipe 34 is connected to the outlet-side header 22c.

The intercooler core 22a includes radiator fins and a plurality of tubes. The inlet-side header 22b and the outlet-side header 22c are not included in the intercooler core 22a. The tubes are arranged in the intercooler core 22a, for example, in such a manner as to extend in Left-Right Direction lr. The radiator fins are arranged in such a manner to be in contact with the tubes. The intake air flows into the plurality of tubes through the intake-side header 22b. The intake air flows from the left 1 to the right r in the plurality of tubes. When the straddled vehicle 1 is moving, the wind blows to the intercooler core 22a from the front F. This wind cools the intake air flowing in the tubes. The cooled intake air flows into the lower intake pipe 34 through the outlet-side header 22c.

The intercooler 22 with the above-described structure is positioned in a place where the intercooler 22 is likely to be exposed to the wind blowing from the front F of the straddle vehicle 1 when the straddle vehicle 1 is moving. Therefore, as shown in FIG. 2, the intercooler 22 is positioned more backward B than the front wheel 4 and more frontward F than the cylinder head cover 20a and the cylinder head 20b of the forward-tilted engine body 20. As shown in FIG. 4, when seen in the backward direction (B), the lower part of the intercooler core 22a is overlapped by the upper part of the front wheel 4. The front wheel 4 is positioned at the center of the intercooler core 22a with respect to Left-Right Direction lr. In addition, as shown in FIG. 2, at least part of the intercooler core 22a is above (U) the front axle Axf of the front wheel 4. In the present embodiment, the intercooler core 22a is entirely above (U) the front axle Axf of the front wheel 4.

As shown in FIG. 4, when seen in the backward direction (B), the intercooler 22 is positioned more upward U than the radiator 24 and the turbocharger 26. Therefore, as shown in FIG. 4, when seen in the backward direction (B), the turbine wheel 126a is positioned more downward (D) than the intercooler 22. The turbine wheel 126a is entirely positioned below (D) the intercooler core 22a and above (U) the radiator core 24a.

[Positions of Intercooler, Radiator and Turbocharger]

Next, the positions of the intercooler 22, the radiator 24 and the turbocharger 26 will be described with reference to FIG. 2. First, various parts of the intercooler 22, the radiator 24 and the turbocharger 26 will be defined as follows.

The upper end in Up-Down Direction UD of the forward-tilted engine body 20 is defined as forward-tilted-engine-body vehicle-upper end EUP (i.e., the "engine-body upper end").

The lower end in Up-Down Direction UD of the forward-tilted engine body 20 is defined as forward-tilted-engine-body vehicle-lower end EDP (i.e., the "engine-body lower end").

The upper end in Up-Down Direction UD of the front wheel 4 is defined as front-wheel vehicle-upper point WUP (i.e., the "wheel upper point").

The lower end in Up-Down Direction UD of the front wheel 4 is defined as front-wheel vehicle-lower point WDP (i.e., the "wheel lower point").

The upper end in Up-Down Direction ud of the intercooler core 22a is defined as intercooler-core cylinder-axis-upper end IUP (i.e., the "intercooler-core upper end").

The lower end in Up-Down Direction ud of the intercooler core 22a is defined as intercooler-core cylinder-axis-lower end IDP (i.e., the "intercooler-core lower end").

The front end in Front-Back Direction fb of the intercooler core 22a is defined as intercooler-core cylinder-axis-front end IFP (i.e., the "intercooler-core front end").

The rear end in Front-Back Direction fb of the intercooler core 22a is defined as intercooler-core cylinder-axis-rear end IBP (i.e., the "intercooler-core rear end").

The upper end in Up-Down Direction ud of the turbine wheel 126a is defined as turbine-wheel cylinder-axis-upper end TUP (i.e., the "turbine-wheel upper end").

The lower end in Up-Down Direction ud of the turbine wheel 126a is defined as turbine-wheel cylinder-axis-lower end TDP (i.e., the "turbine-wheel lower end").

The front end in Front-Back Direction fb of the turbine wheel 126a is defined as turbine-wheel cylinder-axis-front end TFP (i.e., the "turbine-wheel front end").

The rear end in Front-Back Direction fb of the turbine wheel 126a is defined as turbine-wheel cylinder-axis-rear end TBP (i.e., the "turbine-wheel rear end").

The upper end in Up-Down Direction ud of the radiator core 24a is defined as radiator-core cylinder-axis-upper end RUP (i.e., the "radiator-core upper end").

The lower end in Up-Down Direction ud of the radiator core 24a is defined as radiator-core cylinder-axis-lower end RDP (i.e., the "radiator-core lower end").

The front end in Front-Back Direction fb of the radiator core 24a is defined as radiator-core cylinder-axis-front end RFP.

The rear end in Front-Back Direction fb of the radiator core 24a is defined as radiator-core cylinder-axis-rear end REP (i.e., the "radiator-core rear end").

When viewed from a leftward (L) or rightward (R) position, the straight line passing through the forward-tilted-engine-body vehicle-upper end EUP and the front-wheel vehicle-upper point WUP is defined as forward-tilted-engine-body-upper-end-and-front-wheel-upper-point-connecting line L1 (i.e., the "first connecting line").

When viewed from a leftward (L) or rightward (R) position, the straight line passing through the forward-tilted-engine-body vehicle-lower end EDP and the front-wheel vehicle-lower point WDP is defined as forward-tilted-engine-body-lower-end-and-front-wheel-lower-point-connecting line L2 (i.e., the "second connecting line").

When viewed from a leftward (L) or rightward (R) position, the straight line passing through the forward-tilted-engine-body vehicle-upper end EUP and the forward-tilted-engine-body vehicle-lower end EDP is defined as forward-tilted-engine-body upper-and-lower-end-connecting line L3 (i.e., the "third connecting line").

When viewed from a leftward (L) or rightward (R) position, the straight line passing through the front-wheel vehicle-upper point WUP and the front-wheel vehicle-lower point WDP is defined as front-wheel upper-and-lower-point-connecting line L4 (i.e., the "fourth connecting line").

When viewed from a leftward (L) or rightward (R) position, the part of the outside edge of the forward-tilted engine body 20 that is more frontward F than the forward-tilted-engine-body upper-and-lower-end-connecting line L3 is defined as forward-tilted-engine-body front-surface EFS (i.e., the "engine-body front-surface").

When viewed from a leftward (L) or rightward (R) position, the part of the outside edge of the front wheel 4 that is more backward B than the front-wheel upper-and-lower-point-connecting line L4 is defined as front-wheel rear-surface WBS (i.e., the "wheel rear-surface").

At least part of the intercooler 22a, at least part of the turbine wheel 126a and at least part of the radiator core 24a are positioned within a space between the forward-tiled engine body 20 and the front wheel 4. More specifically, when viewed from a leftward (L) or rightward (R) position, at least part of the intercooler 22a, at least part of the turbine wheel 126a and at least part of the radiator core 24a are positioned within an area A1 enclosed by the forward-tilted-engine-body-upper-end-and-front-wheel-upper-point-connecting line L1, the forward-tilted-engine-body-lower-end-and-front-wheel-lower-point-connecting line L2, the forward-tilted-engine-body front-surface EFS and the front-wheel rear-surface WBS. In the present embodiment, when viewed from a leftward (L) or rightward (R) position, the upper end of the intercooler 22a slightly protrudes upward U from the forward-tilted-engine-body-upper-end-and-front-wheel-upper-point-connecting line L1. In addition, when viewed from a leftward (L) or rightward (R) position, the front-lower part of the radiator core 24a slightly protrude forward F from the front-wheel rear-surface WBS. When viewed from a leftward (L) or rightward (R) position, the turbine wheel 126a is completely within the area A1.

The intercooler-core cylinder-axis-upper end IUP is entirely more upward u than the turbine-wheel cylinder-axis-upper end TUP. Especially, the intercooler core 22a is entirely positioned more upward u than the turbine wheel 126a. Accordingly, the intercooler-core cylinder-axis-lower end IDP is entirely positioned more upward u than the turbine-wheel cylinder-axis-upper end TUP.

When viewed from an upward (u) or downward (d) position, the intercooler core 22a is positioned more forward f than the turbine wheel 126a. More specifically, the intercooler-core cylinder-axis-front end IFP is entirely positioned more frontward f than the turbine-wheel cylinder-axis-front end TFP. In addition, the intercooler-core cylinder-axis-rear end IBP is entirely positioned frontward f than the turbine-wheel cylinder-axis-rear end TBP. The turbine-wheel cylinder-axis-front end TFP is entirely positioned more frontward f than the intercooler-core cylinder-axis-rear end IBP. Accordingly, when viewed from an upward (u) or downward (d) position, the intercooler core 22a and the turbine wheel 126a overlap each other. More specifically, when viewed from an upward (u) or downward (d) position, the rear part of the intercooler core 22a and the front part of the turbine wheel 126a overlap with each other.

When viewed from a forward (0 or backward (b) position, the turbine wheel 126a is positioned more upward u than the radiator core 24a. More specifically, the turbine-wheel cylinder-axis-upper end TUP is entirely positioned more upward u than the radiator-core cylinder-axis-upper end RUP. In addition, the turbine-wheel cylinder-axis-lower end TDP is entirely positioned more upward u than the radiator-core cylinder-axis-lower end RDP. The radiator-core cylinder-axis-upper end RUP is entirely positioned more upward u than the turbine-wheel cylinder-axis-lower end TDP. Accordingly, when viewed from a forward (0 or backward (b) position, the radiator core 24a and the turbine wheel 126a overlap with each other. More specifically, when viewed from a forward (0 or backward (b) position, the upper part of the radiator core 24a and the lower part of the turbine wheel 126a overlap with each other.

The radiator core 24a is entirely positioned more frontward f than the turbine wheel 126a. More specifically, the radiator-core cylinder-axis-rear end REP is entirely positioned more frontward f than the turbine-wheel cylinder-axis-front end TFP.

The intercooler core 22a is entirely positioned more upward u than the radiator core 24a. More specifically, the intercooler-core cylinder-axis-lower end IDP is entirely positioned more upward u than the radiator-core cylinder-axis-upper end RUP.

The radiator core 24a is entirely positioned more frontward f than the intercooler core 22a. More specifically, the radiator-core cylinder-axis-rear end REP is entirely positioned more frontward f than the intercooler-core cylinder-axis-front end IFP.

In addition, the radiator core 24a is positioned farther away from the left cylinder axis CyLl, the center cylinder axis CyLc and the right cylinder axis CyLr than any of the intercooler core 22a, the radiator core 24a and the turbine wheel 126a. Accordingly, the radiator-core cylinder-axis-rear end REP is entirely positioned more frontward f than the turbine-wheel cylinder-axis-rear end TBP and the intercooler-core cylinder-axis-rear end IBP.

[Effects]

The straddled vehicle 1 is prevented from increasing in the wheelbase while still containing the turbocharger 26 and the intercooler 22. In the straddled vehicle 1, specifically, when viewed from a leftward (L) or rightward (R) position, at least part of the intercooler 22a, at least part of the turbine wheel 126a and at least part of the radiator core 24a are positioned within the area A1 enclosed by the forward-tilted-engine-body-upper-end-and-front-wheel-upper-point-connect ing line L1, the forward-tilted-engine-body-lower-end-and-front-wheel-lower-point-connecting line L2, the forward-tilted-engine-body front-surface EFS and the front-wheel rear-surface WBS. The straddled vehicle 1 with such a layout is likely to have a great wheelbase, that is, likely to have a great distance between the front axle Axf of the front wheel 4 and the rear axle Axb of the rear wheel 6.

In order to avoid an increase in the wheelbase, the radiator-core cylinder-axis-rear end REP is entirely positioned more frontward f than the turbine-wheel cylinder-axis-rear end TBP and the intercooler-core cylinder-axis-rear end IBP. Accordingly, the distance in Front-Back Direction fb between the intercooler core 22a and the forward-tilted engine body 20 is shorter than the distance in Front Back Direction fb between the radiator core 24a and the forward-tilted engine body 20. Thereby, the straddled vehicle 1 is prevented from increasing in the wheelbase. The reasons will be described in more detail below.

The radiator core 24a cools the coolant for cooling the forward-tilted engine body 20. The intercooler core 22a cools the intake air compressed by the turbocharger 26. Therefore, the intercooler core 22a and the radiator core 24a are connected to the forward-tiled engine body 20 via pipes. The pipe connecting the intercooler core 22a and the forward-tilted engine body 20 and the pipe connecting the radiator core 24a and the forward-tilted engine 20 are different in diameter. Specifically, the radiator core 24a cools a liquid, while the intercooler core 22a cools a gas. Therefore, the pipe connecting the intercooler core 22a and the forward-tilted engine body 20 is likely to be greater in diameter than the pipe connecting the radiator core 24a and the forward-tilted engine body 20.

In the straddled vehicle 1, the radiator-core cylinder-axis-rear end REP is entirely positioned more frontward f than the turbine-wheel cylinder-axis-rear end TBP and the intercooler-core cylinder-axis-rear end IBP. Accordingly, the distance in Front-Back Direction fb between the intercooler core 22a and the forward-tilted engine body 20 is shorter than the distance in Front Back Direction fb between the radiator core 24a and the forward-tilted engine body 20. Therefore, the large-diameter pipe connecting the intercooler core 22a and the forward-tilted engine body 20 is required to be short. As a result, the total volume of the pipe connecting the intercooler core 22a and the forward-tilted engine body 20 and the pipe connecting the radiator core 24a and the forward-tilted engine body 20 becomes smaller. Thus, the wheelbase of the straddled vehicle 1 is prevented from increasing.

Another reason why the straddled vehicle 1 can be prevented from increasing in the wheelbase even though containing the turbocharger 26 and the intercooler 22 will be described. Regarding a forward-tilted engine body like the engine body 20, typically, intake air flows into the forward-tilted engine body through the rear surface thereof, and exhaust air flows out of the forward-tilted engine body through the front surface thereof. Accordingly, the pipe connecting the intercooler core 22a and the forward-tilted engine body 20 should be drawn from a more frontward (0 area than the forward-tilted engine body 20 to a more backward (b) area than the forward-tiled engine body 20 while avoiding the forward-tiled engine body 20. In addition, the exhaust manifold 20f connecting the turbocharger 26 and the forward-tilted engine body 20 should be drawn to a more frontward (0 area than the forward-tilted engine body 20. In the straddled vehicle 1, the intercooler-core cylinder-axis-upper-end IUP is entirely positioned more upward u than the turbine-wheel cylinder-axis-upper end TUP. This arrangement eliminates the need to draw the pipe connecting the intercooler core 22a and the forward-tilted engine body 20 in such a manner to avoid the turbocharger 26. In addition, this arrangement permits the exhaust manifold 20f, which connects the turbocharger 26 and the forward-tilted engine body 20, to achieve a straightforward connection between the turbocharger 26 and the forward-tilted engine body 20. Therefore, the pipe connecting the intercooler core 22a and the forward-tilted engine body 20 and the pipe connecting the turbocharger 26 and the forward-tilted engine body 20 become shorter. As a result, the straddled vehicle 1 can be prevented from increasing in the wheelbase even though containing the turbocharger 26 and the intercooler 22.

Another reason why the straddled vehicle 1 can be prevented from increasing in the wheelbase even though containing the turbocharger 26 and the intercooler 22 will be described. Specifically, the left cylinder axis CyLl, the center cylinder axis CyLc and the right cylinder axis CyLr of the forward-tilted engine body 20 are tilted forward F from Up-Down Direction UD at an angle of 45 degrees or less. Accordingly, the forward-tilted-engine-body front-surface EFS tilts forward F from Up-Down Direction UD. In the straddled vehicle 1, additionally, the intercooler-core cylinder-axis-upper end IUP is entirely positioned more upward u than the turbine-wheel cylinder-axis-upper end TUP. The intercooler-core cylinder-axis-front end IFP is entirely more frontward f than the turbine-wheel cylinder-axis-front end TFP. Accordingly, the intercooler core 22a and the turbine wheel 126a are arranged in up-down direction ud along the forward-tilted-engine-body front-surface EFS. Therefore, it is possible to place the intercooler core 22a and the turbine wheel 126a close to the forward-tilted-engine-body front-surface EFS. As a result, the straddled vehicle 1 can be prevented from increasing in the wheelbase even though containing the turbocharger 26 and the intercooler 22.

Another reason why the straddled vehicle 1 can be prevented from increasing in the wheelbase even though containing the turbocharger 26 and the intercooler 22 will be described. Specifically, the intercooler-core cylinder-axis-lower end IDP is entirely positioned more upward u than the radiator-core cylinder-axis-upper end RUP. Accordingly, when viewed from a forward (f) or backward (b) position, the intercooler core 22a and the radiator core 24a do not overlap with each other. In other words, the intercooler core 22*a* and the radiator core 24*a* are not arranged in front-back direction fb. This arrangement prevents an increase in the dimension in front-back direction fb of the space occupied by the intercooler core 22*a* and the radiator core 24*a*. As a result, the straddled vehicle 1 can be prevented from increasing in the wheelbase even though containing the turbocharger 26 and the intercooler 22.

Another reason why the straddled vehicle 1 can be prevented from increasing in the wheelbase even though containing the turbocharger 26 and the intercooler 22 will be described. In the area above (U) the front axle Axf, the outside edge of the front wheel 4 is curved forward F. Accordingly, in the area, due to the curvature of the front wheel 4, the distance between the outside edge of the front wheel 4 and the forward-tilted engine body 20 gradually increases with going upward U. Therefore, in the area above (U) the front axle Axf, a greater space for some members is more easily available in a more upward (U) part. For this reason, at least part of the intercooler core 22*a* is positioned above (U) the front axle Axf of the front wheel 4. Thereby, the space for the intercooler core 22*a* is easily acquired, and the space for the turbine wheel 126*a* and the radiator core 24*a* become easily available. As a result, the straddled vehicle 1 can be prevented from increasing in the wheelbase even though containing the turbocharger 26 and the intercooler 22.

Another reason why the straddled vehicle 1 can be prevented from increasing in the wheelbase even though containing the turbocharger 26 and the intercooler 22 will be described. In the area above (U) the front axle Axf, the outside edge of the front wheel 4 is curved forward F. Therefore, the intercooler core 22*a* is positioned in such a manner that the third main surface S3 thereof tilts forward F from Up-Down Direction UD. In this way, the intercooler core 22*a* is positioned along the outside edge of the front wheel 4. This makes it possible to place the intercooler core 22*a* close to the front wheel 4. As a result, the straddled vehicle 1 can be prevented from increasing in the wheelbase even though containing the turbocharger 26 and the intercooler 22.

Another reason why the straddled vehicle 1 can be prevented from increasing in the wheelbase even though containing the turbocharger 26 and the intercooler 22 will be described. In the area above (U) the front axle Axf, the outside edge of the front wheel 4 is curved forward F from the vehicle-upward-downward direction. Accordingly, in the area, due to the curvature of the front wheel 4, the distance between the outside edge of the front wheel 4 and the forward-tilted engine body 20 gradually increases with going upward U. Therefore, in the area above (U) the front axle Axf, a greater space for some members is more easily available in a more upward (U) part. For this reason, at least part of the turbine wheel 126*a* is positioned above (U) the front axle Axf of the front wheel 4. Thereby, the space for the turbine wheel 126*a* is easily acquired, and the space for the intercooler core 22*a* and the radiator core 24*a* become easily available. As a result, the straddled vehicle 1 can be prevented from increasing in the wheelbase even though containing the turbocharger 26 and the intercooler 22.

Another reason why the straddled vehicle 1 can be prevented from increasing in the wheelbase even though containing the turbocharger 26 and the intercooler 22 will be described. Specifically, the intercooler core 22*a* is entirely positioned more upward U than the turbine wheel 126*a*. when seen in the downward direction (D), the intercooler core 22*a* overlaps the turbine wheel 126*a*. More specifically, some part of the intercooler core 22*a* is in the same position with respect to Front-Back Direction FB as some part of the turbine wheel 126*a*. This arrangement prevents an increase in the dimension in Front-Back direction FB of the space occupied by the intercooler core 22*a* and the turbine wheel 126*a*. As a result, the straddled vehicle 1 can be prevented from increasing in the wheelbase even though containing the turbocharger 26 and the intercooler 22.

Another reason why the straddled vehicle 1 can be prevented from increasing in the wheelbase even though containing the turbocharger 26 and the intercooler 22 will be described. In the area below (D) the front axle Axf, the outside edge of the front wheel 4 is curved backward B from the vehicle-upward-downward direction. Accordingly, in the area, due to the curvature of the front wheel 4, the distance between the outside edge of the front wheel 4 and the forward-tilted engine body 20 gradually increases with going downward D. Therefore, in the area below (D) the front axle Axf, a greater space for some members is more easily available in a more downward (D) part. For this reason, the radiator-core vehicle-upward-downward-center RCP is positioned below (D) the front axle Axf of the front wheel 4. Thereby, the space for the radiator core 24*a* is easily acquired, and the space for the intercooler core 22*a* and the turbine wheel 126*a* become easily available. As a result, the straddled vehicle 1 can be prevented from increasing in the wheelbase even though containing the turbocharger 26 and the intercooler 22.

Another reason why the straddled vehicle 1 can be prevented from increasing in the wheelbase even though containing the turbocharger 26 and the intercooler 22 will be described. Specifically, in the area below (D) the front axle Axf, the outside edge of the front wheel 4 is curved backward B from the vehicle-upward-downward direction. Therefore, the radiator core 24*a* is positioned in such a manner that the first main surface S1 thereof tilts backward B from Up-Down Direction UD. In this way, the radiator core 24*a* is positioned along the outside edge of the front wheel 4. This makes it possible to place the radiator core 24*a* close to the front wheel 4. As a result, the straddled vehicle 1 can be prevented from increasing in the wheelbase even though containing the turbocharger 26 and the intercooler 22.

(First Modification)

A forward-tilted engine unit 10*a* according to a first modification will be described with reference to the drawings. FIG. 5 is a right side view of the forward-tilted engine unit 10*a* according to the first modification.

The forward-tilted engine unit 10*a* is different from the forward-tilted engine unit 10 in respect of the positions of the intercooler 22, the radiator 24 and the turbocharger 26. In the following, the forward-tilted engine unit 10*a* will be described with a focus on this difference.

The dimension in Up-Down Direction UD of the radiator core 24*a* of the forward-tilted engine unit 10*a* is greater than the dimension in Up-Down Direction UD of the radiator core 24*a* of the forward-tilted engine unit 10. Accordingly, the radiator core 24*a* of the forward-tilted engine unit 10*a* provides better cooling performance.

The dimension in Up-Down Direction UD of the radiator core 24*a* of the forward-tilted engine unit 10*a* is great. Therefore, in order to prevent the radiator core 24*a* from coming into contact with the turbocharger 26, the position of the turbine-wheel cylinder-axis-upper end TUP in the forward-tilted engine unit 10*a* is entirely higher U than the position of the turbine-wheel cylinder-axis-upper end TUP in the forward-tilted engine unit 10. In the forward-tilted engine unit 10*a*, additionally, in order to prevent the intercooler core 22a from coming into contact with the turbocharger 26, the intercooler core 22a is tilted backward B from Up-Down Direction UD. Accordingly, the third main surface S3 tilts backward B from Up-Down Direction UD, and the upper end of the third main surface S3 is entirely positioned backward B than the lower end of the third main surface S3. There are no other differences in the structure between the forward-tilted engine unit 10 and the forward-tilted engine unit 10a, and the structure of the forward-tilted engine unit 10a will not be described any more.

The straddled vehicle 1 with the above-structured forward-tilted engine unit 10a can be prevented from increasing in the wheelbase even though containing the turbocharger 26 and the intercooler 22 for the same reasons as described in connection with the straddled vehicle 1 with the forward-tilted engine unit 10.

(Second Modification)

A forward-tilted engine unit 10b according to a second modification will be described with reference to the drawings. FIG. 6 is a right side view of the forward-tilted engine unit 10b according to the second modification.

The forward-tilted engine unit 10b is different from the forward-tilted engine unit 10 in respect of the positions of the intercooler 22, the radiator 24 and the turbocharger 26. In the following, the forward-tilted engine unit 10b will be described with a focus on this difference.

The dimension in Up-Down Direction UD of the intercooler core 22a of the forward-tilted engine unit 10b is greater than the dimension in Up-Down Direction UD of the intercooler core 22a of the forward-tilted engine unit 10. Accordingly, the intercooler core 22a of the forward-tilted engine unit 10b provides better cooling performance.

The dimension in Up-Down Direction UD of the intercooler core 22a of the forward-tilted engine unit 10b is great. Therefore, in order to prevent the intercooler core 22a from coming into contact with the turbocharger 26, the position of the turbine-wheel cylinder-axis-upper end TUP in the forward-tilted engine unit 10b is entirely lower D than the position of the turbine-wheel cylinder-axis-upper end TUP in the forward-tilted engine unit 10. There are no other differences in the structure between the forward-tilted engine unit 10 and the forward-tilted engine unit 10b, and the structure of the forward-tilted engine unit 10b will not be described any more.

The straddled vehicle 1 with the above-structured forward-tilted engine unit 10b can be prevented from increasing in the wheelbase even though containing the turbocharger 26 and the intercooler 22 for the same reasons as described in connection with the straddled vehicle 1 with the forward-tilted engine unit 10.

(Third Modification)

A forward-tilted engine unit 10c according to a third modification will be described with reference to the drawings. FIG. 7 is a right side view of the forward-tilted engine unit 10c according to the third modification.

The forward-tilted engine unit 10c is different from the forward-tilted engine unit 10 in respect of the positions of the intercooler 22, the radiator 24 and the turbocharger 26. Specifically, in the forward-tilted engine unit 10, as shown in FIG. 2, when viewed from a leftward (L) or rightward (R) position, the upper end part of the intercooler core 22a slightly protrudes upward U from the forward-tilted-engine-body-upper-end-and-front-wheel-upper-point-connect ing line L1. In addition, as shown in FIG. 2, when viewed from a leftward (L) or rightward (R) position, the front-lower part of the radiator core 24a slightly protrudes forward F from the front-wheel rear-surface WBS. In the forward-tilted engine unit 10a, however, as shown in FIG. 7, the intercooler core 22a, the turbine wheel 126a and the radiator core 24a are entirely positioned within the area A1 enclosed by the forward-tilted-engine-body-upper-end-and-front-wheel-upper-point-connect ing line L1, the forward-tilted-engine-body-lower-end-and-front-wheel-lower-point-connecting line L2, the forward-tilted-engine-body front-surface EFS and the front-wheel rear-surface WBS. In other words, when viewed from a leftward (L) or rightward (R) position, none of the intercooler 22a, the turbine wheel 126a and the radiator core 24a protrudes outside the area A1. There are no other differences in the structure between the forward-tilted engine unit 10 and the forward-tilted engine unit 10c, and the structure of the forward-tilted engine unit 10c will not be described any more.

The straddled vehicle 1 with the above-structured forward-tilted engine unit 10c can be prevented from increasing in the wheelbase even though containing the turbocharger 26 and the intercooler 22 for the same reasons as described in connection with the straddled vehicle 1 with the forward-tilted engine unit 10.

Other Embodiments

The embodiments and modifications described herein and/or illustrated by the drawings are to make the present teaching easier to understand and not to limit the concept of the present teaching. It is possible to adapt or alter the embodiments and modifications described above without departing from the gist thereof.

The gist includes all equivalent elements, modifications, omissions, combinations (for example, combinations of features of the embodiments and modifications), adaptations and alterations as would be appreciated by those skilled in the art based on the embodiments and modifications disclosed herein. The limitations in the claims are to be interpreted broadly based on the language employed in the claims and not limited to the embodiments described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

The straddled vehicle 1 includes one front wheel 4. However, the number of front wheels 4 of the straddled vehicle 1 is not limited to one. The straddled vehicle 1 may include two front wheels 4 or may include three or more front wheels 4.

The straddled vehicle 1 includes one rear wheel 6. However, the number of rear wheels 6 of the straddled vehicle 1 is not limited to one. The straddled vehicle 1 may include two rear wheels 6 or may include three or more rear wheels 6.

Thus, the straddled vehicle 1 may be a three-wheeled or four-wheeled motorcycle. The straddled vehicle 1 may be a motorcar including four or more wheels.

In each of the forward-tilted engine units 10, 10a, 10b and 10c, the crankshaft axis Cr intersects with the left cylinder axis CyLl, the center cylinder axis CyLc and the right cylinder axis CyLr. However, the crankshaft axis Cr does not necessarily intersect with the left cylinder axis CyLl, the center cylinder axis CyLc or the right cylinder axis CyLr. In other words, the crankshaft axis Cr may be entirely positioned a little more frontward f or more backward b than the left cylinder axis CyL1, the center cylinder axis CyLc and the right cylinder axis CyLr.

Each of the forward-tilted engine units 10, 10a, 10b and 10c has two camshafts. Thus, the forward-tilted engine units 10, 10a, 10b and 10c are DOHC (double overhead camshaft) engines. However, the forward-tilted engine units 10, 10a, 10b and 10c are not necessarily DOHC engines. The forward-tilted engine units 10, 10a, 10b and 10c may be, for example, SOHC (single overhead camshaft) engines or OHV (overhead valve) engines.

The forward-tilted engine units 10, 10a, 10b and 10c are of a direct-injection type in which an injector injects fuel into the left combustion chamber 200l, the center combustion chamber 200c and the right combustion chamber 200r. However, the forward-tilted engine units 10, 10a, 10b and 10c may be of a port-injection type in which an injector injects fuel into the intake manifold 38. In addition, the injector may be replaced with a carburetor.

In each of the forward-tilted engine units 10, 10a, 10b and 10c, the exhaust manifold 20f is formed integrally with the cylinder head 20b. However, in each of the forward-tilted engine units 10, 10a, 10b and 10c, the exhaust manifold 20f may be structured in such a manner to be separable from the cylinder head 20b without breaking the cylinder head 20 and the exhaust manifold 20f.

In the straddled vehicle 1, the vehicle body frame 2 leans leftward L when the straddled vehicle 1 turns to the left L. The vehicle frame 2 leans rightward R when the straddled vehicle 1 turns to the right R. Thus, the straddled vehicle 1 is a leaning vehicle. However, the vehicle body frame 2 does not necessarily lean when the straddled vehicle 1 turns to the left L or the right R. When the straddled vehicle 1 turns to the left L, the vehicle body frame 2 may lean rightward R by a centrifugal force. When the straddled vehicle 1 turns to the right R, the vehicle body frame 2 may lean leftward L by a centrifugal force. Thus, the straddled vehicle 1 is not necessarily a leaning vehicle. An example of the straddled vehicle 1 that is not a leaning vehicle is ATV (all terrain vehicle).

In each of the forward-tilted engine units 10, 10a, 10b and 10c, at least part of the intercooler core 22a is above (U) the front axle Afx of the front wheel 4. In each of the forward-tilted engine units 10, 10a, 10b and 10c, however, the intercooler core 22a may be entirely positioned below (D) the front axle Axf of the front wheel 4.

In each of the forward-tilted engine units 10, 10a and 10c, the intercooler core 22a tilts forward F from Up-Down Direction UD. However, the intercooler core 22a may be tilted backward B from Up-Down Direction UD as in the forward-tilted engine unit 10b.

In each of the forward-tilted engine units 10, 10a, 10b and 10c, the radiator core 24a tilts backward B from Up-Down Direction UD. However, the radiator core 24a may be tilted forward F from Up-Down Direction UD.

In each of the forward-tilted engine units 10, 10a, 10b and 10c, at least part of the turbine wheel 126a is above (U) the front axle Axf of the front wheel 4. However, the turbine wheel 126a may be entirely positioned below (D) the front axle Axf of the front wheel 4.

In each of the forward-tilted engine units 10, 10a, 10b and 10c, the intercooler core 22a is positioned more upward U than the turbine wheel 126a. Therefore, when seen in the downward direction (D), the intercooler core 22a overlaps the turbine wheel 126a. However, the intercooler core 22a is not necessarily positioned more upward U than the turbine wheel 126a. Accordingly, when seen in the downward direction (D), the intercooler core 22a does not necessarily overlap the turbine wheel 126a.

In each of the forward-tilted engine units 10, 10a, 10b and 10c, the radiator-core vehicle-upward-downward-center RCP is positioned below (D) the front axle Axf of the front wheel 4. However, the radiator-core vehicle-upward-downward-center RCP may be at the same position, with respect to Up-Down Direction UD, as the front axle Axf of the front wheel 4. Alternatively, the radiator-core vehicle-upward-downward-center RCP may be positioned above (U) the front axle Axf of the front wheel 4.

In each of the forward-tilted engine units 10, 10a, 10b and 10c, the turbine-wheel cylinder-axis-lower end TDP is entirely positioned more upward u than the radiator-core cylinder-axis-lower end RDP. However, the turbine-wheel cylinder-axis-lower end TDP may be at the same level, with respect to Up-Down Direction ud, as the radiator-core cylinder-axis-lower end RDP. Alternatively, the turbine-wheel cylinder-axis-lower end TDP may be entirely positioned more downward d than the radiator-core cylinder-axis-lower end RDP.

In each of the forward-tilted engine units 10, 10a, 10b and 10c, the turbine-wheel cylinder-axis-upper end TUP is entirely positioned more upward u than the radiator-core cylinder-axis-upper end RUP. However, the turbine-wheel cylinder-axis-upper end TUP may be at the same level, with respect to Up-Down Direction ud, as the radiator-core cylinder-axis-upper end RUP. Alternatively, the turbine-wheel cylinder-axis-upper end TUP may be entirely positioned more downward d than the radiator-core cylinder-axis-upper end RUP.

In each of the forward-tilted engine units 10, 10a, 10b and 10c, the radiator-core cylinder-axis-rear end RBP is entirely positioned more frontward f than the turbine-wheel cylinder-axis-front end TFP. However, the radiator-core cylinder-axis-rear end REP may be at the same level, with respect to Front-Back Direction fb, as the turbine-wheel cylinder-axis-front end TFP. The radiator-core cylinder-axis-rear end REP may be entirely positioned more backward b than the turbine-wheel cylinder-axis-front end TFP.

In each of the forward-tilted engine units 10, 10a and 10b, the radiator-core cylinder-axis-upper end RUP is entirely positioned more upward u than the turbine-wheel cylinder-axis-lower end TDP. However, as in the forward-engine unit 10c, the radiator-core cylinder-axis-upper end RUP may be at the same level, with respect to Up-Down Direction ud, as the turbine-wheel cylinder-axis-lower end TDP. Alternatively, the radiator-core cylinder-axis-upper end RUP may be entirely positioned more downward d than the turbine-wheel cylinder-axis-lower end TDP.

The forward-tilted engine units 10, 10a, 10b and 10c are gasoline engines. However, the forward-tilted engine units 10, 10a, 10b and 10c may use any other kind of fuel than gasoline, for example, such as gas oil, biodiesel, methanol, etc.

The forward-tilted engine units 10, 10a, 10b and 10c are parallel three-cylinder engines. However, the forward-tilted engine unit 10, 10a, 10b and 10c may be single-cylinder, parallel two-cylinder or parallel four-cylinder engines. Alternatively, the forward-tilted engine units 10, 10a, 10b and 10c may be parallel multicylinder engines having five or more cylinders. The forward-tilted engine units 10, 10a, 10b and 10c are not V engines. Accordingly, the forward-tilted engine units 10, 10a, 10b and 10c do not have any cylinder axes tilted backward B from Up-Down Direction UD.

REFERENCE SIGNS LIST

1: straddled vehicle
2: vehicle body frame
4: front wheel
6: rear wheel
8: steering mechanism
10, 10a, 10b, 10c: forward-tilted engine unit
12: seat
20: forward-tilted engine body
20a: cylinder head cover
20b: cylinder head
20c: cylinder block
20d: crank case
20e: oil pan
20f: exhaust manifold
20g: transmission
22: intercooler
22a: intercooler core
22b: inlet-side header
22c: outlet-side header
24: radiator
24a: radiator core
26: turbocharger
30: upper intake pipe
32: middle intake pipe
34: lower intake pipe
36: throttle body
38: intake manifold
40: exhaust device
126a: turbine wheel
126b: compressor wheel
126c: shaft
200l: left combustion chamber
200c: center combustion chamber
200r: right combustion chamber
202l: left cylinder bore
202c: center cylinder bore
202r: right cylinder bore
226: turbocharger case
226a: turbine housing
226b: compressor housing
226c: center housing
A1: area
Axb: rear axle
Axf: front axle
Cr: crankshaft axis
CyLl: left cylinder axis
CyLc: center cylinder axis
CyLr: right cylinder axis
EDP: forward-tilted-engine-body vehicle-lower end
EFS: forward-tilted-engine-body front-surface
EPl: left exhaust port
EPc: center exhaust port
EPr: right exhaust port
EUP: forward-tilted-engine-body vehicle-upper end
IBP: intercooler-core cylinder-axis-rear end
IDP: intercooler-core cylinder-axis-lower end
IFP: intercooler-core cylinder-axis-front end
IPl: left intake port
IPc: center intake port
IPr: right intake port
IUP: intercooler-core cylinder-axis-upper end
L1: forward-tilted-engine-body-upper-end-and-front-wheel-upper-point-connecting line
L2: forward-tilted-engine-body-lower-end-and-front-wheel-lower-point-connecting line
L3: forward-tilted-engine-body upper-and-lower-end-connecting line
L4: front-wheel upper-and-lower-end-connecting line
REP: radiator-core cylinder-axis-rear end
RCP: radiator-core vehicle-upward-downward-center
RDP: radiator-core cylinder-axis-lower end
RFP: radiator-core cylinder-axis-front end
RUP: radiator-core cylinder-axis-upper end
S1: first main surface
S2: second main surface
S3: third main surface
S4: fourth main surface
TBP: turbine-wheel cylinder-axis-rear end
TDP: turbine-wheel cylinder-axis-lower end
TFP: turbine-wheel cylinder-axis-front end
TUP: turbine-wheel cylinder-axis-upper end
WBS: front-wheel rear-surface
WDP: front-wheel vehicle-lower point
WUP: front-wheel vehicle-upper point

The invention claimed is:
1. A straddled vehicle comprising:
a body frame;
an engine unit supported by the body frame, the engine unit being a single-cylinder engine or a parallel multi-cylinder engine; and
a front wheel that is positioned more frontward, in a forward-backward direction of the straddled vehicle, than the engine unit in a side view of the straddled vehicle, wherein
the engine unit includes:
an engine body having a cylinder axis that tilts forward from an upward-downward direction of the straddled vehicle at an angle of 45 degrees or less;
a radiator, including a radiator core, that cools a coolant for cooling the engine body;
a turbocharger, including:
a turbine wheel that is rotatable by exhaust air from the engine body, and
a compressor wheel that is connected to the turbine wheel and that rotates together with the turbine wheel, the turbocharger compressing intake air thereof by the rotation of the compressor wheel; and
an intercooler, including an intercooler core, that cools the intake air compressed by the turbocharger,
at least a part of the intercooler, at least a part of the turbine wheel, and at least a part of the radiator core being positioned within a space between the forward-tilted engine body and the front wheel;
the straddled vehicle has
an engine-body upper end that is an upper end of the engine body in the upward-downward direction of the straddled vehicle,
an engine-body lower end that is a lower end of the engine body in the upward-downward direction of the straddled vehicle,
a wheel upper point that is an upper point of the front wheel in the upward-downward direction of the straddled vehicle,
a wheel lower point that is a lower point of the front wheel in the upward-downward direction of the straddled vehicle,
a first connecting line that is a straight line passing through the engine-body upper end and the wheel upper point, a second connecting line that is a straight line passing through the engine-body lower end and the wheel lower point,
a third connecting line that is a straight line passing through the engine-body upper end and the engine-body lower end,
a fourth connecting line that is a straight line passing through the wheel upper point and the wheel lower point,
an engine-body front-surface that is a part of an outside edge of the engine body that is more frontward than the third connecting line, and
a wheel rear-surface that is a part of an outside edge of the front wheel that is more backward than the fourth connecting line, wherein
in the side view of the straddled vehicle, at least a part of the intercooler core, at least a part of the turbine wheel and at least a part of the radiator core are all within an area enclosed by the first connecting line, the second connecting line, the engine-body front-surface, and the wheel rear-surface;
the straddled vehicle further has
an intercooler-core upper end that is an upper end of the intercooler core in an upward-downward direction of the cylinder axis, which is a direction in which the cylinder axis extends, and
a turbine-wheel upper end that is an upper end of the turbine wheel in the upward-downward direction of the cylinder axis, wherein
the entire intercooler-core upper end is positioned more upward than the turbine-wheel upper end in the upward-downward direction of the cylinder axis;
the straddled vehicle further has
an intercooler-core front end that is a front end of the intercooler core in a forward-backward direction of the cylinder axis, which is perpendicular to the upward-downward direction of the cylinder axis, and
a turbine-wheel front end that is a front end of the turbine wheel in the forward-backward direction of the cylinder axis, wherein
the entire intercooler-core front end is positioned more frontward than the turbine-wheel front end in the forward-backward direction of the cylinder axis;
the straddled vehicle further has
an intercooler-core lower end that is a lower end of the intercooler core in the upward-downward direction of the cylinder axis, and
a radiator-core upper end that is an upper end of the radiator core in the upward-downward direction of the cylinder axis, wherein
the entire intercooler-core lower end is positioned more upward than the radiator-core upper end in the upward-downward direction of the cylinder axis; and
the straddled vehicle further has
a radiator-core rear end that is a rear end of the radiator core in the forward-backward direction of the cylinder axis,
a turbine-wheel rear end that is a rear end of the turbine wheel in the forward-backward direction of the cylinder axis, and
an intercooler-core rear end that is a rear end of the intercooler core in the forward-backward direction of the cylinder axis, wherein
the entire radiator-core rear end is positioned more frontward than both the turbine-wheel rear end and the intercooler-core rear end in the forward-backward direction of the cylinder axis.

2. The straddled vehicle according to claim 1, wherein the front wheel has a front axle, and
at least a part of the intercooler core is above the front axle of the front wheel in the upward-downward direction of the straddled vehicle.

3. The straddled vehicle according to claim 2, wherein:
the intercooler core is of a board shape having two main surfaces, which are
a third main surface having a normal vector thereof extending forward in the forward-backward direction of the straddled vehicle, and
a fourth main surface having a normal vector thereof extending backward in the forward-backward direction of the straddled vehicle; and
the third main surface tilts forward from the upward-downward direction of the straddled vehicle.

4. The straddled vehicle according to claim 1, wherein the front wheel has a front axle, and
at least a part of the turbine wheel is above the front axle of the front wheel in the upward-downward direction of the straddled vehicle.

5. The straddled vehicle according to claim 1, wherein the intercooler core is positioned more upward than the turbine wheel in the upward-downward direction of the straddled vehicle.

6. The straddled vehicle according to claim 1, wherein the front wheel has a front axle, and
a center of the radiator core, with respect to the upward-downward direction of the straddled vehicle, is positioned more downward than the front axle of the front wheel.

7. The straddled vehicle according to claim 6, wherein:
the radiator core is of a board shape having two main surfaces, which are
a first main surface having a normal vector thereof extending forward in the forward-backward direction of the straddled vehicle, and
a second main surface having a normal vector thereof extending backward in the forward-backward direction of the straddled vehicle; and
the first main surface tilts backward from the upward-downward direction of the straddled vehicle.

8. The straddled vehicle according to claim 1, further includes
a turbine-wheel lower end that is a lower end of the turbine wheel in the upward-downward direction of the cylinder axis, and
a radiator-core lower end that is a lower end of the radiator core in the upward-downward direction of the cylinder axis, wherein
the entire turbine-wheel lower end is positioned more upward than the radiator-core lower end in the upward-downward direction of the cylinder axis.

9. The straddled vehicle according to claim 1, wherein the entire turbine-wheel upper end is positioned more upward than the radiator-core upper end in the upward-downward direction of the cylinder axis.

10. The straddled vehicle according to claim 1, wherein the entire radiator-core rear end is positioned more frontward than the turbine-wheel front end in the frontward-backward direction of the cylinder axis.

11. The straddled vehicle according to claim 1, further includes
a turbine-wheel lower end that is a lower end of the turbine wheel in the upward-downward direction of the cylinder axis, wherein the entire radiator-core upper end is positioned more upward than the turbine-wheel lower end in the upward-downward direction of the cylinder axis.

\* \* \* \* \*